US012587436B2

(12) United States Patent
Yoo et al.

(10) Patent No.: US 12,587,436 B2
(45) Date of Patent: *Mar. 24, 2026

(54) APPARATUS AND METHOD FOR PERFORMING DUAL CONNECTIVITY IN WIRELESS COMMUNICATION SYSTEM

(71) Applicant: Samsung Electronics Co., Ltd., Suwon-si (KR)

(72) Inventors: Seungbo Yoo, Suwon-si (KR); Weiwei Wang, Beijing (CN); Beomsik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,866

(22) Filed: Dec. 6, 2023

(65) Prior Publication Data

US 2024/0129181 A1    Apr. 18, 2024

Related U.S. Application Data

(63) Continuation of application No. 16/585,909, filed on Sep. 27, 2019, now Pat. No. 11,863,372.

(Continued)

(51) Int. Cl.
*H04W 36/00* (2009.01)
*H04L 41/0668* (2022.01)
(Continued)

(52) U.S. Cl.
CPC .......... *H04L 41/0668* (2013.01); *H04L 67/10* (2013.01); *H04W 28/0252* (2013.01); *H04W 88/02* (2013.01)

(58) Field of Classification Search
CPC ........... H04W 88/085; H04W 36/0033; H04W 76/34; H04W 76/27
See application file for complete search history.

(56) References Cited

U.S. PATENT DOCUMENTS 10,075,279 B2    9/2018   Yang et al.
10,616,789 B2    4/2020   Byun et al.
(Continued)

FOREIGN PATENT DOCUMENTS

CN       108476546 A       8/2018
CN       108541032 A       9/2018
(Continued)

OTHER PUBLICATIONS

International Search Report dated Jan. 10, 2020, issued in an International Application No. PCT/KR2019/012662.
(Continued)

*Primary Examiner* — Sai Aung
(74) *Attorney, Agent, or Firm* — Jefferson IP Law, LLP

(57) ABSTRACT

A method of a central unit-control plane (CU-CP) included in a base station in a wireless communication system and an apparatus therefor are provided. The method includes identifying information on a radio link of at least one cell associated with the base station, transmitting, to a central unit-user plane (CU-UP), information indicating downlink transmission stop or resume of the CU-UP included in the base station based on the information on the radio link, and transmitting, to a distributed unit (DU), information indicating downlink transmission stop or resume of the DU based on the information on the radio link. The method relates to converging a 4th-Generation (4G) or a 5th-Generation (5G) communication system for supporting higher data rates beyond a 4G system with a technology for Internet of Things (IoT), and may be applied to intelligent services based on the 5G communication technology and the IoT-related technology.

20 Claims, 25 Drawing Sheets

Related U.S. Application Data

(60) Provisional application No. 62/737,469, filed on Sep. 27, 2018.

(51) Int. Cl.

| | |
|---|---|
| *H04L 67/10* | (2022.01) |
| *H04W 28/02* | (2009.01) |
| *H04W 72/04* | (2023.01) |
| *H04W 88/02* | (2009.01) |

(56) References Cited

U.S. PATENT DOCUMENTS

| | | | | |
|---|---|---|---|---|
| 10,708,968 | B2 | 7/2020 | Kim | |
| 10,736,172 | B2 | 8/2020 | Zhang et al. | |
| 10,813,137 | B2 | 10/2020 | Shih et al. | |
| 10,980,081 | B2 | 4/2021 | Lee et al. | |
| 11,523,309 | B2 | 12/2022 | Xu et al. | |
| 11,533,651 | B2 * | 12/2022 | Liu | H04W 88/085 |
| 11,588,594 | B2 * | 2/2023 | Park | H04W 76/32 |
| 2013/0188618 | A1 | 7/2013 | Dinan | |
| 2013/0188619 | A1 * | 7/2013 | Dinan | H04W 56/0045 |
| | | | | 370/336 |
| 2015/0016611 | A1 * | 1/2015 | Wu | H04W 12/04 |
| | | | | 380/270 |
| 2015/0133122 | A1 | 5/2015 | Chen | |
| 2015/0156810 | A1 | 6/2015 | Wu et al. | |
| 2015/0327107 | A1 | 11/2015 | Kim et al. | |
| 2016/0044743 | A1 | 2/2016 | Xu et al. | |
| 2016/0183156 | A1 | 6/2016 | Chin et al. | |
| 2016/0192249 | A1 | 6/2016 | Wu | |
| 2016/0212753 | A1 | 7/2016 | Wu | |
| 2016/0227524 | A1 | 8/2016 | Choi et al. | |
| 2016/0242191 | A1 | 8/2016 | Liao et al. | |
| 2016/0277987 | A1 | 9/2016 | Chen et al. | |
| 2016/0302256 | A1 | 10/2016 | Susitaival et al. | |
| 2016/0338136 | A1 | 11/2016 | Zhang et al. | |
| 2016/0366720 | A1 | 12/2016 | Wu | |
| 2017/0149546 | A1 * | 5/2017 | Zhang | H04W 72/542 |
| 2017/0164221 | A1 | 6/2017 | Bergstrom et al. | |
| 2017/0170941 | A1 | 6/2017 | Yang et al. | |
| 2017/0195996 | A1 | 7/2017 | Fujishiro | |
| 2017/0257812 | A1 * | 9/2017 | Dai | H04W 36/0079 |
| 2017/0273095 | A1 | 9/2017 | Heo et al. | |
| 2017/0280501 | A1 | 9/2017 | Xu et al. | |
| 2018/0034515 | A1 * | 2/2018 | Guo | H04W 72/1215 |
| 2018/0160339 | A1 | 6/2018 | Wu | |
| 2018/0160458 | A1 | 6/2018 | Wu | |
| 2018/0184482 | A1 | 6/2018 | Susitaival et al. | |
| 2018/0279186 | A1 * | 9/2018 | Park | H04W 36/302 |
| 2018/0279375 | A1 * | 9/2018 | Jeon | H04W 72/23 |
| 2019/0069333 | A1 * | 2/2019 | Kim | H04W 36/0033 |
| 2019/0082363 | A1 | 3/2019 | Park et al. | |
| 2019/0089579 | A1 | 3/2019 | Sang et al. | |
| 2019/0132066 | A1 | 5/2019 | Park et al. | |
| 2020/0022043 | A1 | 1/2020 | Pelletier et al. | |
| 2020/0077288 | A1 * | 3/2020 | Tsuboi | H04W 24/10 |
| 2020/0145079 | A1 * | 5/2020 | Marinier | H04B 7/06966 |
| 2020/0229049 | A1 * | 7/2020 | Wu | H04W 76/12 |
| 2020/0305213 | A1 | 9/2020 | Teyeb et al. | |
| 2020/0322864 | A1 * | 10/2020 | Wu | H04W 76/34 |

FOREIGN PATENT DOCUMENTS

| | | | |
|---|---|---|---|
| EP | 3 737 008 A1 | 11/2020 | |
| GB | 2575033 A | 1/2020 | |
| GB | 2575469 A | 1/2020 | |
| KR | 10-2014-0137277 A | 12/2014 | |
| KR | 10-2015-0128527 A | 11/2015 | |
| KR | 10-2016-0089354 A | 7/2016 | |
| KR | 10-2017-0039301 A | 4/2017 | |
| KR | 10-2018-0071365 A | 6/2018 | |

OTHER PUBLICATIONS

China Telecom et al., 'Motivation for Study on Enhancement for Disaggregated gNB Architecture', RP-181777, 3GPP TSG RAN Meeting #81, Golden Coast, Australia, Sep. 3, 2018, See slides 2-4, 7.

'3GPP; TSGRAN; NG-RAN; E1 Application Protocol (E1AP) (Release 15)', 3GPP TS 38.463 V15.1.0; Sep. 25, 2018, See sections 8.3.2, 9.2.2.4, 9.3.1.11.

NEC: "NR Corrections (38.401 Baseline CR covering RAN3-101 agreements)", 3GPP Draft; 38401 CR0022R2 (Rel-15) R3-185316, 3rd Generation Partnership Project (3GPP), Mobile Competence Centre ; 650, Route Des Lucioles ; F-06921 Sophia-Antipolis Cedex ; France, vol. RAN WG3, No. XP051513508; Sep. 6, 2018, Gothenburg, Sweden.

Extended European Search Report dated Oct. 7, 2021, issued in a counterpart European Application No. 19865119.2.

European Office Action dated Jul. 10, 2023, issued in European Patent Application No. 19865119.2.

ETSI MCC, Report of 3GPP TSG RAN meeting #99, R3-182323, Apr. 25, 2018.

Chinese Office Action dated Oct. 25, 2023, issued in Chinese Patent Application No. 201980063248.3.

Rapporteur (NEC); NR Corrections (38.401 Baseline CR covering RAN3-101 agreements); 3GPP TSG-RAN WG3 #101; R3-185316; Sep. 3, 2018, Gothenburg, Sweden.

Korean Office Action dated Mar. 5, 2025, issued in a Korean Patent Application No. 10-2019-0120079.

Korean Notice of Decision of Grant dated Nov. 24, 2025, issued in Korean Patent Application No. 10-2019-0120079.

European Office Action dated Oct. 8, 2025, issued in European Patent Application No. 19865119.2.

* cited by examiner

Figure 12:
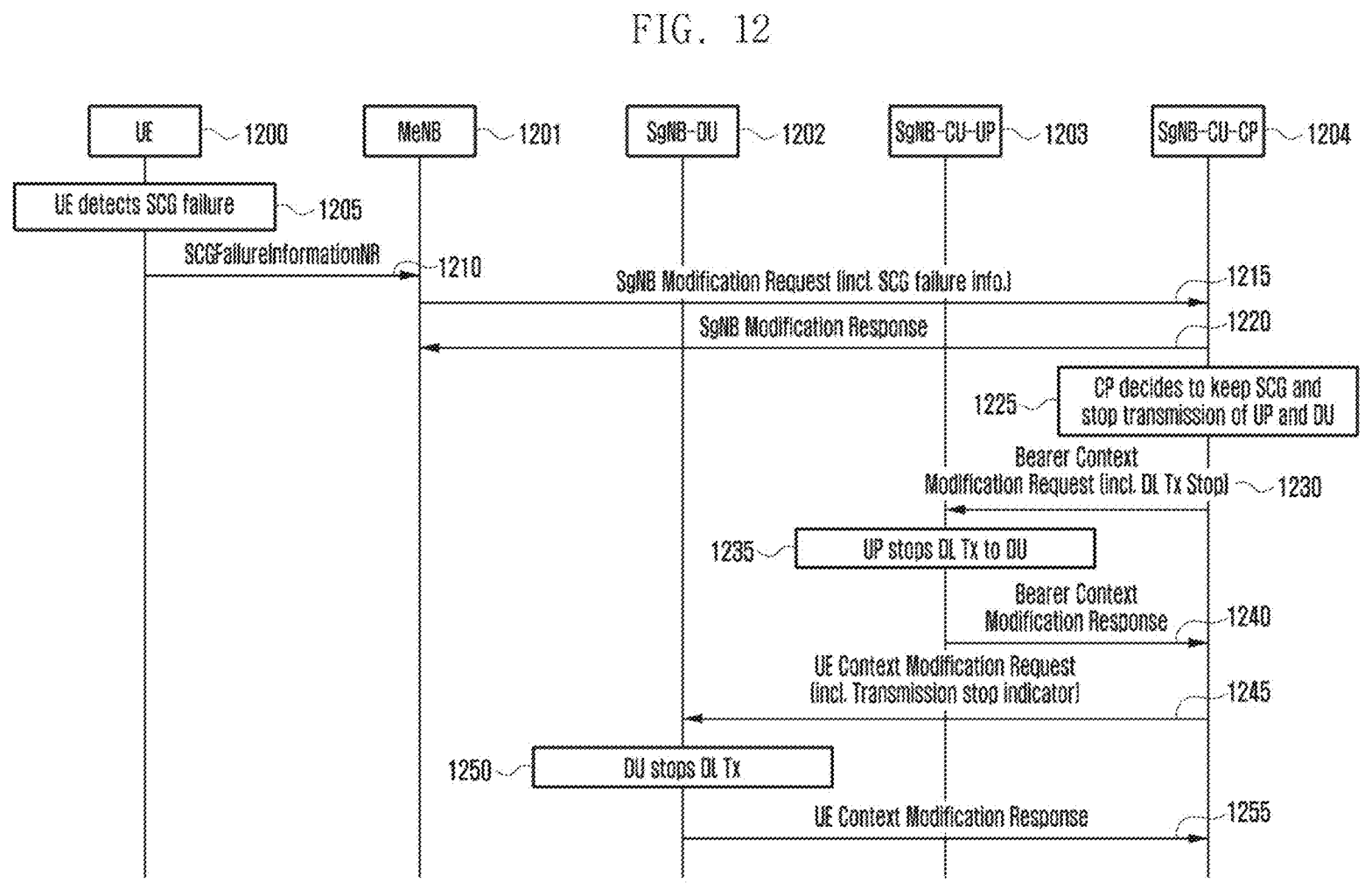

UE detects SCG failure ~ 1205

SCGFailureInformationNR ~ 1210

MeNB ~ 1201

SgNB-DU ~ 1202

SgNB-CU-UP ~ 1203

SgNB-CU-CP ~ 1204

SgNB Modification Request (incl. SCG failure info.) ~ 1215

SgNB Modification Response ~ 1220

CP decides to keep SCG and stop transmission of UP and DU ~ 1225

Bearer Context Modification Request (incl. DL Tx Stop) ~ 1230

UP stops DL Tx to DU ~ 1235

Bearer Context Modification Response ~ 1240

UE Context Modification Request (incl. Transmission stop indicator) ~ 1245

DU stops DL Tx ~ 1250

UE Context Modification Response ~ 1255

| IE/Group Name | Presence | Range | IE type and reference | Semantics description |
|---|---|---|---|---|
| Cell Group List | | | | |
| >Cell Group Item | | 1..<maxno ofCell Groups> | | |
| >>Cell Group ID | M | | INTEGER (0..3, ...) | Cell group ID as defined in TS 38.331 [10] (0=MCG, 1=SCG). In this version of the specification, values "2" and "3" shall not be set by the sender and ignored by the receiver. |
| >>UL Configuration | O | | 9.3.1.33 | Indicates whetehr the Cell Group is used for UL traffic. |
| >>DL TX Stop  1610 | O | | ENUMERATED (stop, ···, resume)  1611  1613 | |
| >>RAT Type | O | | ENUMERATED (EUTRA, NR, ···) | Indicates the RAT. |

FIG. 18

| IE/Group Name | Presence | Range | IE type and reference | Semantics description |
|---|---|---|---|---|
| Transmission Stop Indicator | M | | ENUMERATED (true, ⋯, resume) | |

| IE/Group Name | Presence | Range | IE type and reference | Semantics description |
|---|---|---|---|---|
| CHOICE Cause Group | M | | | |
| >Radio Network Layer | | | | |
| >>Radio Network Layer Cause  1910 | M | | ENUMERATED (Unspecified, RL failure, Unknown or already allocated gNB-CU UE F1AP ID, Unknown or already allocated gNB-DU UE F1AP ID, Unknown or inconsistent pair of UE F1AP ID, Interaction with other procedure, Not supported QCI Value, Action Desirable for Radio Reasons, No Radio Resources Available, Procedure cancelled, Normal Release, ..., RL Recovery)  1911 | |

APPARATUS AND METHOD FOR PERFORMING DUAL CONNECTIVITY IN WIRELESS COMMUNICATION SYSTEM

CROSS-REFERENCE TO RELATED APPLICATION(S)

This application is a continuation application of prior application Ser. No. 16/585,909 filed on Sep. 27, 2019, which is based on and claims priority under 35 U.S.C § 119(e) of a U.S. Provisional application Ser. No. 62/737,469 filed on Sep. 27, 2018 in the U.S. Patent and Trademark Office, the disclosure of each of which is incorporated by reference herein in its entirety.

BACKGROUND

1. Field

The disclosure relates to a processing method and apparatus in a secondary base station supporting a secondary radio access technology (RAT) if a radio link failure (RLF) occurs due to a radio problem or the like in the secondary RAT or if a radio link is recovered in a dual connectivity (DC) situation between homogeneous or heterogeneous radio access technologies (RATs).

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post LTE System'. The 5G communication system is considered to be implemented in higher frequency millimeter wave (mm-Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid Frequency-Shift Keying (FSK) and Quadrature Amplitude Modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In a wireless communication system supporting evolved universal terrestrial radio access and new radio dual connectivity (EN-DC) in the related art, if a radio link failure (RLF) occurs in a specific cell among serving cells belonging to a SCG (referred to as "SCG-RLF" or "SCG failure") in the secondary cell group (SCG) related to a secondary base station, a terminal (UE) may transmit information related to the SCG-RLF (referred to as "SCG failure information") to a master base station (master node (MN), master eNB, or MeNB) or the second base station.

If the SCG failure information is received from the UE, the master base station or the secondary base station may perform a primary secondary cell (Pscell) change or a bearer type change.

However, if the SCG failure occurs in the existing wireless communication system supporting the EN-DC, there is no signaling whereby the gNB-CU-CP transmits the SCG failure information to the gNB-CU-UP or the gNB-DU, and thus the gNB-CU-UP or the gNB-DU is unable to perform a processing operation related to the SCG failure occurrence.

The above information is presented as background information only to assist with an understanding of the disclosure. No determination has been made, and no assertion is made, as to whether any of the above might be applicable as prior art with regard to the disclosure.

SUMMARY

Aspects of the disclosure address at least the above-mentioned problems and/or disadvantages and provides at least the advantages described below. Accordingly, an aspect of the disclosure is to provide a method in which a CU-UP or a DU performs a processing operation related to a SCG failure occurrence or a processing operation related to a SCG resume through transmission and reception of information related to a SCG failure between a CU-CP, CU-UP, and DU included in a secondary base station or information related to a radio link (RL) recovery during the SCG failure occurrence or the radio link (RL) recovery in a wireless system supporting dual connectivity.

Additional aspects will be set forth in part in the description which follows and, in part, will be apparent from the description, or may be learned by practice of the presented embodiments.

According to the disclosure, a CU-CP of a secondary node (SN) may transmit information indicating downlink transmission stop or resume to a CP-UP or a DU if a radio link failure (RLF) or a radio link (RL) recovery occurs in the secondary node, and thus the CP-UP or the DU may perform a process related to the downlink transmission stop or resume in a wireless communication system supporting dual connectivity.

According to the disclosure, a CU-CP may transmit information indicating downlink transmission stop or resume of a CU-UP to the CU-UP during SCG failure occurrence or radio link recovery, and thus the CU-UP may perform a downlink transmission suspend, path switching to another base station, retransmission, or resume with respect to a SCG bearer or a split bearer.

According to the disclosure, a CU-CP may transmit information indicating downlink transmission stop or resume of a DU to the DU during SCG failure occurrence or recovery, and thus the DU may perform a downlink transmission suspend, path switching to another base station, retransmission, or resume with respect to a SCG bearer or a split bearer.

In accordance with an aspect of the disclosure, a method of a central unit-control plane (CU-CP) included in a base station in a wireless communication system is provided. The method includes identifying information on a radio link of at least one cell associated with the base station, transmitting, to a central unit-user plane (CU-UP), information indicating downlink transmission stop or resume of the CU-UP included in the base station based on the information on the radio link, and transmitting, to a distributed unit (DU), information indicating downlink transmission stop or resume of the DU based on the information on the radio link.

In accordance with another aspect of the disclosure, a method of a central unit-user plane (CU-UP) included in a base station in a wireless communication system is provided. The method includes receiving information indicating downlink transmission stop or resume from a central unit-control plane (CU-CP) included in the base station, and stopping or resuming downlink transmission to a distributed unit (DU) based on the information indicating the downlink transmission stop or resume.

In accordance with another aspect of the disclosure, a method of a distributed unit (DU) included in a base station in a wireless communication system is provided. The method includes receiving information indicating downlink transmission stop or resume from a central unit-control plane (CU-CP) included in the base station, and stopping or resuming downlink transmission to a terminal based on the information indicating the downlink transmission stop or resume.

In accordance with another aspect of the disclosure, a central unit-control plane (CU-CP) included in a base station in a wireless communication system is provided. The central unit includes a transceiver, and at least one processor configured to identify information on a radio link of at least one cell associated with the base station, control the transceiver to transmit, to a central unit-user plane (CU-UP), information indicating downlink transmission stop or resume of the CU-UP included in the base station based on the information on the radio link, and control the transceiver to transmit, to a distributed unit (DU), information indicating downlink transmission stop or resume of the DU based on the information on the radio link.

In accordance another aspect of the disclosure, a central unit-user plane (CU-UP) included in a base station in a wireless communication system is provided. The central unit includes a transceiver, and at least one processor configured to control the transceiver to receive information indicating downlink transmission stop or resume from a central unit-control plane (CU-CP) included in the base station, and control to stop or resume downlink transmission to a distributed unit (DU) based on the information indicating the downlink transmission stop or resume.

In accordance with another aspect of the disclosure, a distributed unit (DU) included in a base station in a wireless communication system is provided. The distributed unit includes a transceiver, and at least one processor configured to control the transceiver to receive information indicating downlink transmission stop or resume from a central unit-control plane (CU-CP) included in the base station, and control to stop or resume downlink transmission to a terminal based on the information indicating the downlink transmission stop or resume.

According to the disclosure, if the radio link failure (RLF) occurs or the radio link (RL) recovery occurs in the secondary node in a wireless communication system supporting dual connectivity, the CU-CP of the SN transmits information indicating the downlink transmission stop or resume to the CP-UP or the DU of the SN, and thus the CP-UP or the DU can perform the process related to the downlink transmission stop or resume.

According to the disclosure, even if the RLF occurs in the secondary node during the dual connectivity operation between the heterogeneous or homogeneous radio access technologies (RATs) in the terminal, it is possible to guarantee the minimum or zero interruption time and the maximized throughput as compared with the existing ones.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 12 is a diagram illustrating an operation in which a CU-UP or a DU suspends downlink transmission in the case where a radio link failure (RLF) occurs in a SN in a wireless communication system supporting dual connectivity according to an embodiment of the disclosure;

FIG. 16 is a diagram illustrating a configuration of a message that a CU-CP included in a SN transmits to a CU-UP or an information element in a wireless communication system supporting dual connectivity according to an embodiment of the disclosure;

FIG. 18 is a diagram illustrating a configuration of a message that a CU-CP included in a SN transmits to a DU or an information element in a wireless communication system supporting dual connectivity according to an embodiment of the disclosure;

FIG. 19 is a diagram illustrating a configuration of a message that a DU included in a SN transmits to a CU-CP or an information element in the case where a radio link (RL) recovery occurs in the SN in a wireless communication system supporting dual connectivity according to an embodiment of the disclosure;

Throughout the drawings, like reference numerals will be understood to refer to like parts, components, and structures.

DETAILED DESCRIPTION

Figure 1:
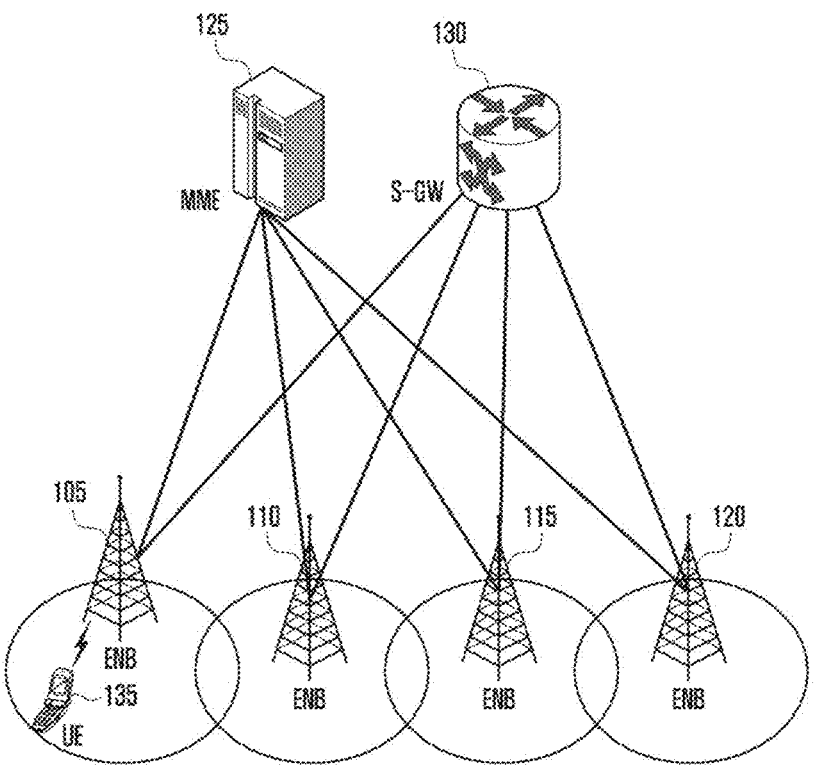
FIG. 1 is a diagram showing the architecture of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, a term to identify an access node, a term to denote network entities, a term to denote messages, a term to denote an interface between network entities, and a term to denote a variety of types of identity information have been illustrated for convenience of description. Accordingly, the disclosure is not limited to the following terms, and other terms to denote targets having equivalent technical meanings may be used.

For convenience of description, in the disclosure, terms and names defined in long term evolution (LTE) of a 3rd generation partnership project (hereinafter referred to as "3GPP"), new radio (NR) standards are used. However, the disclosure is not restricted by the terms and names, and may be identically applied to systems complying with other standards.

First, terms used in this specification are defined.

In this specification, a radio bearer may include a data radio bearer (DRB) and a signaling radio bearer (SRB).

For example, a data radio bearer (DRB) provided in a radio interface between a terminal and a base station is a path through which the data of a user plane is forwarded. A signaling radio bearer (SRB) may be a path through which the data of a control plane, such a radio resource control (RRC) layer and non-access-stratum (NAS) control message, is forwarded.

In this specification, a wireless communication system supported in a network over which a plurality of communication systems interwork may support interworking between heterogeneous technologies frequency bands (multi-RAT interworking).

For example, the radio access technology may be a new radio access network (new RAN) supporting all of a 4G radio access technology (E-UTRA), a radio access technology evolved from 4G (evolved E-UTRA), and a 5G radio access technology (new radio (NR)).

In this specification, an inter system supporting same or different communication networks may be basically divided into a terminal, a radio access network, and a plurality of core networks (CNs).

In this specification, a terminal may be an integrated terminal supporting all of a 4G radio access technology (E-UTRA), a radio access technology evolved from 4G (evolved E-UTRA), and a 5G radio access technology (new radio (NR)).

In this specification, a radio access network, a base station, and a network node may be used as the same meaning A base station may include a 5G base station (or new radio base station or gNB) using the 5G radio access technology (new radio (NR)), a 4G base station (LTE-eNB) using the 4G radio access technology (E-UTRA), and a base station (eLTE eNB) using the radio access technology evolved from 4G (evolved E-UTRA). Furthermore, the base station (eLTE eNB) may support the 4G radio access technology and the 5G radio access technology at the same time.

According to this specification, a wireless communication system, in which a terminal can perform communication with at least one cell associated with a first base station and at least one cell associated with a second base station, may support dual connectivity between the first base station and the second base station supporting heterogeneous or homogeneous radio access technology.

For example, the dual connectivity disclosed in this specification may include a case where both the first and second base stations relates to dual connectivity which concerns a 4G system or a case where the first base station relates to a 4G system and the second base station supports an NR system (E-UTRA-NR dual connectivity, EN-DC). Furthermore, even though the wireless communication system being disclosed in this specification relates to an EN-DC system, the system need not be limited thereto and can also embrace a multi-radio dual connectivity (MR-DC) system.

In an EN-DC system disclosed in this specification, a main base station may be used as the same meaning as a master base station, a master node (MN), or a master eNB (MeNB). A sub-base station may be used as the same meaning as a secondary base station, a secondary node (SN), or a secondary gNB (SgNB).

In the EN-DC system disclosed in this specification, a terminal may be connected to one eNB that operates as a master base station and one en-gNB that operates as a secondary base station.

The eNB may be connected to an EPC through an S1 interface and may be connected to an en-gNB through an X2 interface, and the en-gNB may be connected to the EPC through the S1. The en-gNB may be connected to the EPC through an X2-U interface or an S1-U interface.

In a homogeneous or heterogeneous network supporting small cell evolution, there are various requirements related to mobility robustness, signaling load being increased due to frequent handovers, improvement of throughput per user, system capacity, and the like.

The dual connectivity (CE) may imply control and data disconnection. For example, control signaling for mobility is provided through a macro cell at the same time as the time when a high-speed data connection is provided through a small cell.

Further, a disconnection between a downlink and an uplink and a connection between the downlink and the uplink are provided through other cells.

In the dual connectivity, the UE may be connected to one master node (MN) and one secondary node (SN).

In addition, a DC in which a carrier aggregation (CA) is configured means an operation mode of the UE in an RRC connected state, and it is composed of a master cell group and a secondary cell group.

Here, "cell group" indicates a group of serving cells related to a master base station or a secondary base station in the dual connectivity.

A "master cell group (MCG)" is a group of serving cells related to the master base station, and it includes a primary cell (PCell) and selectively one or more secondary cells (SCells) in the dual connectivity.

A "secondary cell group (SCG)" indicates a group of serving cells related to the secondary base station including a primary SCell (PSCell) and selectively one or more SCells.

Here, the "cell" as described hereinafter should be discriminated from a "cell" as a general area covered by the base station. That is, the cell indicates a combination of resources of a downlink and selectively an uplink.

Linking between a carrier frequency (e.g., center frequency of a cell) of a downlink resource and a carrier frequency of an uplink resource is indicated in system information that is transmitted from downlink resources.

An MCG bearer is a radio protocol located in the master base station only to use only resources provided by the master base station in the dual connectivity, and a SCG bearer is a radio protocol located in the secondary base station only to use resources provided by the secondary base station in the dual connectivity.

Further, a split bearer is a radio protocol located in both the master base station and the secondary base station to use all resources provided by the master base station and the secondary base station in the dual connectivity.

FIG. 1 is a diagram showing the architecture of an LTE system according to an embodiment of the disclosure.

Referring to FIG. 1, the radio access network of the LTE system is configured with next-generation evolved Node Bs (hereinafter referred to as "ENBs", "Node Bs" or "base stations") 105, 110, 115, and 120, a mobility management entity (MME) 125, and a serving-gate (S-GW) 130. A user equipment (hereinafter referred to as a "UE or terminal") 135 accesses an external network through the ENBs 105~120 and the S-GW 130.

Referring to FIG. 1, the ENBs 105~120 correspond to the existing Node Bs of a universal mobile telecommunication system (UMTS) system. The ENB is connected to the UE 135 through a radio channel and performs a more complex function than the existing Node B. In the LTE system, all of types of user traffic including real-time services, such as voice over IP (VoIP), through the Internet protocol, are served through a shared channel. Accordingly, a device that performs schedules by collecting state information, such as the buffer state, available transmission power state, and channel state of UEs, is used. The ENBs 105~120 are in charge of such a device. In general, one ENB controls multiple cells. For example, in order to implement the transfer rate of 100 Mbps, the LTE system uses orthogonal frequency division multiplexing (hereinafter referred to as "OFDM") as a radio access technology in the 20 MHz bandwidth, for example. Furthermore, the LTE system adopts an adaptive modulation & coding (hereinafter referred to as "AMC") scheme for determining a modulation scheme and a channel coding rate based on the channel state of a UE. The S-GW 130 provides a data bearer and generates or removes a data bearer under the control of the MME 125. The MME 125 is in charge of various control functions in addition to a mobility management function for a UE, and is connected to multiple ENBs.

Figure 2:
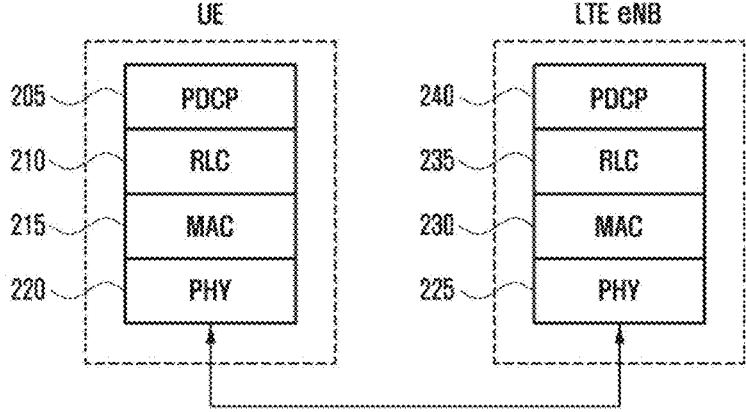
FIG. 2 is a diagram showing a radio protocol structure in the LTE system according to an embodiment of the disclosure.

FIG. 2 is a diagram showing a radio protocol structure in an LTE system according to an embodiment of the disclosure.

Referring to FIG. 2, the radio protocol of the LTE system includes packet data convergence protocols (PDCPs) 205 and 240, radio link control (RLC) 210 and 235, and medium access control (MAC) 215 and 230 in a UE and an ENB, respectively. The PDCPs 205 and 240 are in charge of an operation, such as IP header compression/restoration. Major functions of the PDCP are summarized as follows.

Header compression and decompression: ROHC only

Transfer of user data

In-sequence delivery of upper layer PDUs in PDCP re-establishment procedure for RLC AM Reordering function (for split bearers in DC (only support for RLC AM): PDCP PDU routing for transmission and PDCP PDU reordering for reception)

Duplicate detection of lower layer SDUs in PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink.

The RLC 210, 235 reconfigures a PDCP packet data unit (PDU) in a proper size and performs an ARQ operation. Major functions of the RLC are summarized as follows.

Transfer of upper layer PDUs

ARQ function (Error Correction through ARQ (only for AM data transfer))

Concatenation, segmentation and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC 215, 230 is connected to multiple RLC layer devices configured in one UE, and performs an operation of multiplexing RLC PDUs with a MAC PDU and demultiplexing RLC PDUs from a MAC PDU. Major functions of the MAC are summarized as follows.

Mapping between logical channels and transport channels

Multiplexing/demultiplexing of MAC SDUs belonging to one or different logical channels into/from transport blocks (TB) delivered to/from the physical layer on transport channels)

Scheduling information reporting

Error correction through HARQ

Priority handling between logical channels of one UE

Priority handling between UEs by means of dynamic scheduling

MBMS service identification

Transport format selection

Padding

A physical layer 220, 225 performs an operation of channel-coding and modulating higher layer data, generating the higher layer data into an OFDM symbol, and transmitting the OFDM symbol through a radio channel or of demodulating an OFDM symbol received through a radio channel, channel-decoding the OFDM symbol, and transmitting the OFDM symbol to a higher layer.

Figure 3:
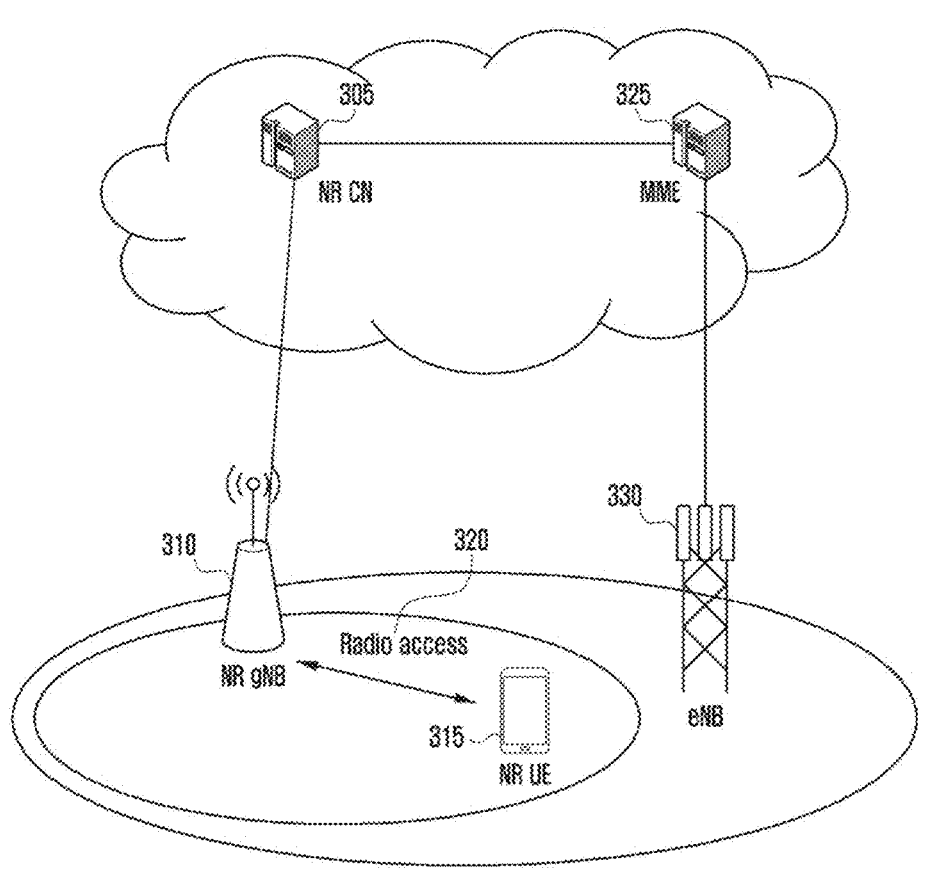
FIG. 3 is a diagram showing the architecture of a next-generation mobile communication system according to an embodiment of the disclosure.

FIG. 3 is a diagram showing the architecture of a next-generation mobile communication system according to an embodiment of the disclosure.

Referring to FIG. 3, the radio access network of the next-generation mobile communication system (hereinafter referred to as "NR" or "5G") is configured with a new radio Node B (hereinafter referred to as an "NR gNB" or an "NR base station") 310 and a new radio core network (NR CN) 305. A new radio user equipment (hereinafter referred to as an "NR UE" or a "terminal") 315 accesses an external network through the NR gNB 310 and the NR CN 305.

Referring to FIG. 3, the NR gNB 310 corresponds to the existing evolved Node B (eNB) of an LTE system. The NR gNB is connected to the NR UE 315 through a radio channel 320, and may provide an excellent service compared to the existing Node B. In a next-generation mobile communication system, a device for performing scheduling by collecting state information, such as the buffer state, available transmission power state, and channel state of UEs is used because all of types of user traffic are served through a shared channel. The NR gNB 310 is in charge of the device. In general, one NR gNB controls multiple cells. In order to implement ultra-high speed data transfer compared to the existing LTE, the next-generation mobile communication system may have the existing maximum bandwidth or more and may additionally graft the beamforming technology using OFDM as a radio access technology. Furthermore, the next-generation mobile communication system adopts the AMC scheme that determines a modulation scheme and a channel coding rate based on the channel state of a UE. The NR CN 305 performs functions, such as mobility support, a bearer configuration, and a QoS configuration. The NR CN is in charge of various control functions in addition to a mobility management function for a UE, and is connected to multiple eNBs. Furthermore, the next-generation mobile communication system may also operate in conjunction with the existing LTE system. The NR CN is connected to an MME 325 through a network interface. The MME is connected to an eNB 330, that is, the existing base station.

Figure 4:
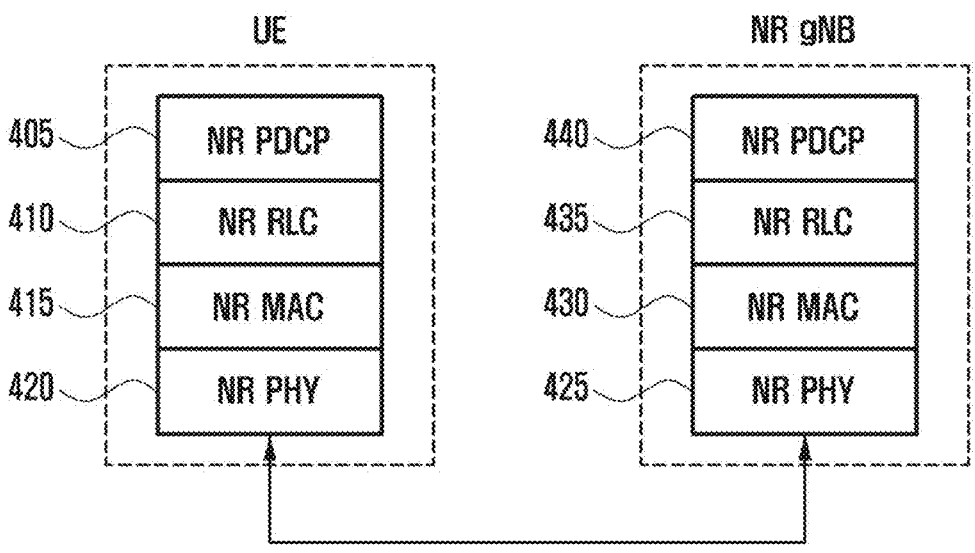
FIG. 4 is a diagram showing the radio protocol structure of a next-generation mobile communication system according to an embodiment of the disclosure.

FIG. 4 is a diagram showing the radio protocol structure of a next-generation mobile communication system according to an embodiment of the disclosure.

Referring to FIG. 4, the radio protocol of the NR is configured with NR PDCPs 405 and 440, NR RLC 410 and 435, and NR MAC 415 and 430, respectively, in an NR UE and an NR base station. Major functions of the NR PDCP 405, 440 may include some of the following functions.

Header compression and decompression: ROHC only

Transfer of user data

In-sequence delivery of upper layer PDUs

PDCP PDU reordering for reception

Duplicate detection of lower layer SDUs

Retransmission of PDCP SDUs

Ciphering and deciphering

Timer-based SDU discard in uplink.

The reordering function of the NR PDCP entity refers to a function for sequentially reordering PDCP PDUs received from a lower layer based on a PDCP sequence number (SN). The reordering function may include a function for transmitting data to a higher layer in a reordered sequence. Furthermore, the reordering function of the NR PDCP entity may include a function for reordering sequences and recording lost PDCP PDUs, a function for making a status report on lost PDCP PDUs to the transmission side, and a function for requesting the retransmission of lost PDCP PDUs.

Major functions of the NR RLC 410, 435 may include some of the following functions.

Transfer of upper layer PDUs

In-sequence delivery of upper layer PDUs

Out-of-sequence delivery of upper layer PDUs

Error Correction through ARQ

Concatenation, segmentation and reassembly of the RLC SDUs

Re-segmentation of RLC data PDUs

Reordering of RLC data PDUs

Duplicate detection

Protocol error detection

RLC SDU discard

RLC re-establishment

The in-sequence delivery function for the NR RLC entity refers to a function for transmitting RLC SDUs, received from a lower layer, to a higher layer in sequence, and may include a function for reassembling and transmitting multiple RLC SDUs if one RLC SDU has been originally segmented into the multiple RLC SDUs and received. Furthermore, the in-sequence delivery function of the NR RLC entity may include a function for reordering received RLC PDUs based on an RLC sequence number (SN) or a PDCP sequence number (SN) and a function for reordering sequences and recording lost RLC PDUs. Furthermore, the in-sequence delivery function of the NR RLC entity may include a function for transmitting a status report on lost RLC PDUs to the transmission side, a function for requesting the retransmission of lost RLC PDUs, and a function for transmitting only RLC SDUs prior to a lost RLC SDU to a higher layer in sequence if the lost RLC SDU is present. Furthermore, the in-sequence delivery function of the NR RLC entity may include a function for transmitting all RLC SDUs, received before a given timer expires, to a higher layer in sequence when the timer expires although there is a lost RLC SDU or a function for transmitting all RLC SDUs, received so far, to a higher layer when a given timer expires although there is a lost RLC SDU. Furthermore, in the above, RLC PDUs may be processed in sequence that they are received (in order of arrival regardless of the sequence of sequence numbers) and transmitted to the PDCP entity regardless of their sequence (i.e., out-of sequence delivery). In the case of a segment, segments stored in a buffer or segments to be received subsequently may be received and reconfigured into one complete RLC PDU. The one complete RLC PDU may be processed and transmitted to the PDCP entity. The NR RLC layer may not include a concatenation function. The concatenation function may be performed in the NR MAC layer or may be substituted with the multiplexing function of the NR MAC layer.

The out-of-sequence delivery function for the NR RLC entity refers to a function for directly transmitting RLC SDUs received from a lower layer to a higher layer regardless of their sequence. The out-of-sequence delivery function may include a function for reassembling multiple RLC SDUs if one RLC SDU has been originally segmented into the multiple RLC SDUs and received and a function for storing the RLC SN or PDCP SN of received RLC PDUs, reordering their sequence, and recording lost RLC PDUs.

The NR MAC 415, 430 may be connected to multiple NR RLC layer devices configured in one UE. Major functions of the NR MAC may include some of the following functions.

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

MBMS service identification

Transport format selection

Padding

An NR PHY layer 420, 425 may perform an operation of channel-coding and modulating higher layer data, generating the higher layer data into an OFDM symbol, and transmitting the OFDM symbol to a radio channel or demodulating an OFDM symbol received through a radio channel, channel-decoding the OFDM symbol, and transferring the OFDM symbol to a higher layer.

Figure 5A:
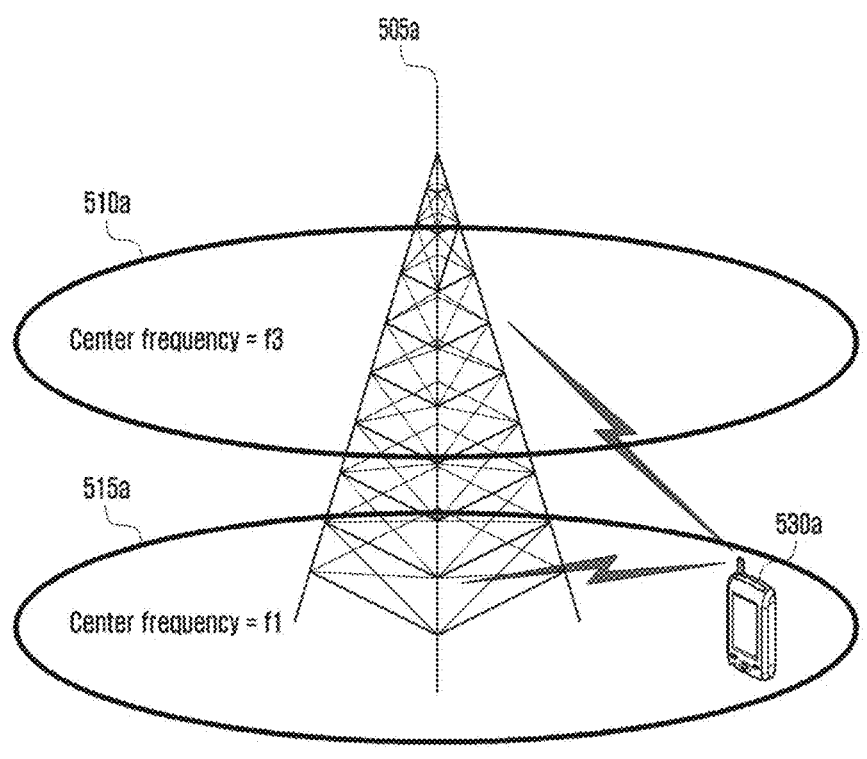
FIG. 5A is a diagram illustrating intra-eNB carrier aggregation for a UE according to an embodiment of the disclosure.

FIG. 5A is a diagram explaining intra-eNB carrier aggregation (CA) according to an embodiment of the disclosure.

Referring to FIG. 5A, an eNB transmits and receives signals through multiple carriers across a plurality of frequency bands. For example, the eNB 505a can be configured to use the carrier 515a with center frequency f1 and the carrier 510a with center frequency f3. If carrier aggregation is not supported, the UE 530a has to transmit/receive data using one of the carriers 510a and 515a. However, the UE 530a having the carrier aggregation capability can transmit/receive data using both the carriers 510a and 515a. The eNB can increase the amount of the resource to be allocated to the UE having the carrier aggregation capability in adaptation to the channel condition of the UE so as to improve the data rate of the UE 530a. This approach of aggregating the downlink carriers transmitted by or uplink carriers received by an eNB is referred to as intra-eNB carrier aggregation.

However, there may be a situation requiring an approach of aggregating the downlink carriers transmitted by different eNBs or the uplink carriers received by different eNBs unlike the situation of FIG. 5A.

Figure 5B:
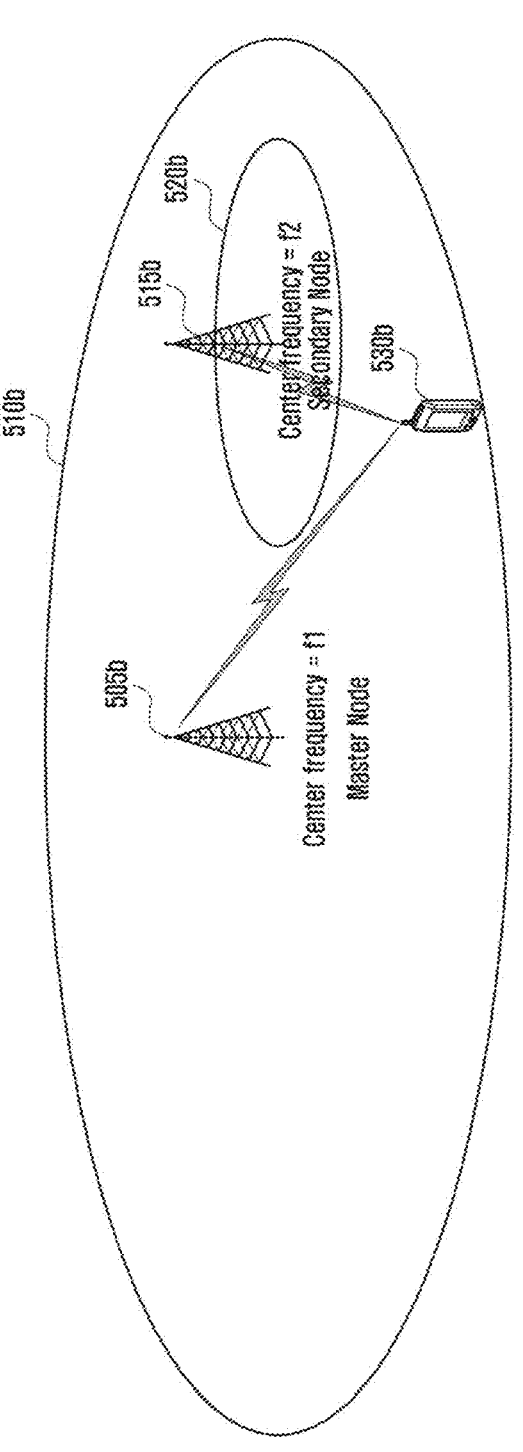
FIG. 5B is a diagram illustrating inter-eNB carrier aggregation according to an embodiment of the disclosure.

FIG. 5B is a diagram illustrating inter-eNB carrier aggregation according to an embodiment of the disclosure.

Referring to FIG. 5B, assuming that eNB 1 (master node) 505b operates a carrier with the center frequency at f1 and eNB 2 (secondary node) 515b a carrier with the center frequency at f2, if the UE 530b aggregates the carrier with the downlink center frequency at f1 and the carrier with the downlink center frequency at f2, i.e. one UE 530b aggregates the carriers of two different eNBs, and this is referred to as inter-eNB Carrier Aggregation (CA) in the disclosure. In the following description, the term 'Dual Connectivity (DC)' is used interchangeably with the term 'inter-eNB CA'. For example, if DC is configured, this means that the inter-eNB CA is configured.

The following definitions are provided to facilitate understanding of certain terms used frequently herein.

Assuming that a cell is configured with one downlink carrier and one uplink carrier of an eNB in the concept of the related art, the carrier aggregation can be understood as if the UE communicates data via multiple cells. At this time, the peak data rate and the number of aggregated carriers have positive correlation.

In the following description, if a UE receives data through a certain downlink carrier or transmits data through a certain uplink carrier, this means the UE transmits/receives data through a control channel and a data channel provided by the cell corresponding to the center frequency and frequency band characterizing the carrier. In the following description, the carrier aggregation can be expressed like this 'a plurality of serving cells are configured' along with the use of the terms 'Primary Serving cell (PCell),' 'Secondary Serving cell (SCell),' 'activated service cell,' etc. These terms are used in the same meaning as those used in the LTE/NR mobile communication system. In following description, the terms 'carrier,' 'component carrier,' and 'serving cell' are used interchangeably in the same meaning In the following description, a set of the serving cells controlled by one eNB is referred to as a Cell Group or Carrier Group (CG). A cell group is classified into one of Master Cell Group (MCG) and Secondary Cell Group (SCG).

The MCG denotes a set of the serving cell controlled by an eNB controlling the PCell (hereinafter, master node), and the SCG denotes a set of the serving cells controlled by the eNB which does not control the PCell, i.e. the eNB which controls only SCells (hereinafter, secondary node). The eNB notifies the UE whether a serving cell belongs to the MCG or SCG in the procedure of configure the corresponding serving cell.

A UE may be configured with one MCG and one or more SCGs. Although the description is directed to the case where one SCG is configured for convenience purpose, the subject matter of the disclosure can be applied, without modification, to the case where more than one SCG are configured. The PCell and SCell are terms expressing the types of the serving cell configured to the UE. The PCell and SCell are different in that the PCell always remains in the activated state while the SCell transitions between the activated state and the deactivated state repeatedly according to the command of the eNB. The UE mobility is controls mainly in association with the PCell, and the SCell may be understood as an extra serving cell for data communication. In the following description, the terms 'PCell' and 'SCell' are used in the same meaning as those defined in the LTE/NR standards.

The disclosure is directed to the network in which the macro and pico cells coexist. The macro cell is the cell controlled by a macro eNB and has a relatively large service coverage area. In contrast, the pico cell is the cell controlled by the SeNB and has a small service coverage area as compared to the macro cell. Although there is no strict criterion for distinguishing between the macro and pico cells, it is assumed that the macro cell has a radius about 500 m while the pico cell has a radius about a few meters. In the following description, the terms 'pico cell' and 'small cell' are used interchangeably.

Referring to FIG. 5B, if the eNB 1 505b is the MeNB and the eNB 2 515b is the SeNB, the serving cell 510b having the center frequency at f1 is the serving cell belonging to the MCG, and the serving cell 520b having the center frequency at f2 is the serving cell belonging to the SCG.

In the following description, other terms may be used interchangeably with MCG and SCG to help understanding. For example, the terms 'primary set' and 'secondary set' and 'primary carrier group' and 'secondary carrier group' may be used interchangeably. However, it is noted that they are different in spelling but the same in meaning. The main purpose of these terms is to clarify which cell is under the control of the eNB controlling the PCell of a specific UE, and the UE and the corresponding cell may operate differently depending on whether the corresponding cell is controlled by the eNB controlling the PCell of the specific UE or not.

The UE may be configured with one or more SCGs. The SCG may include a plurality of SCells of which one has a special attribute.

In the intra-eNB CA, the UE transmits the HARQ feedback and CSI for the SCell(s) as well as the HARQ feedback and CSI for the PCell through the PCell PUCCH. This is to apply the CA to the UE having no simultaneous uplink transmission capability.

In the inter-eNB CA, it may be impossible to transmit the HARQ feedback and CSI of the SCG SCells on the PCell PUCCH. This is because although the HARQ feedback has to be delivered within the HARQ Round Trip Time (RTT) (typically 8 ms) the transmission delay between the MeNB and SeNB may be longer than the HARQ RTT.

In order to solve this problem, PUCCH transmission resource is configured to one of the SCG SCells to transmit the HARQ feedback and CSI for the SCG SCells. This special SCell is referred to as primary SCell (PSCell).

Figure 6A:
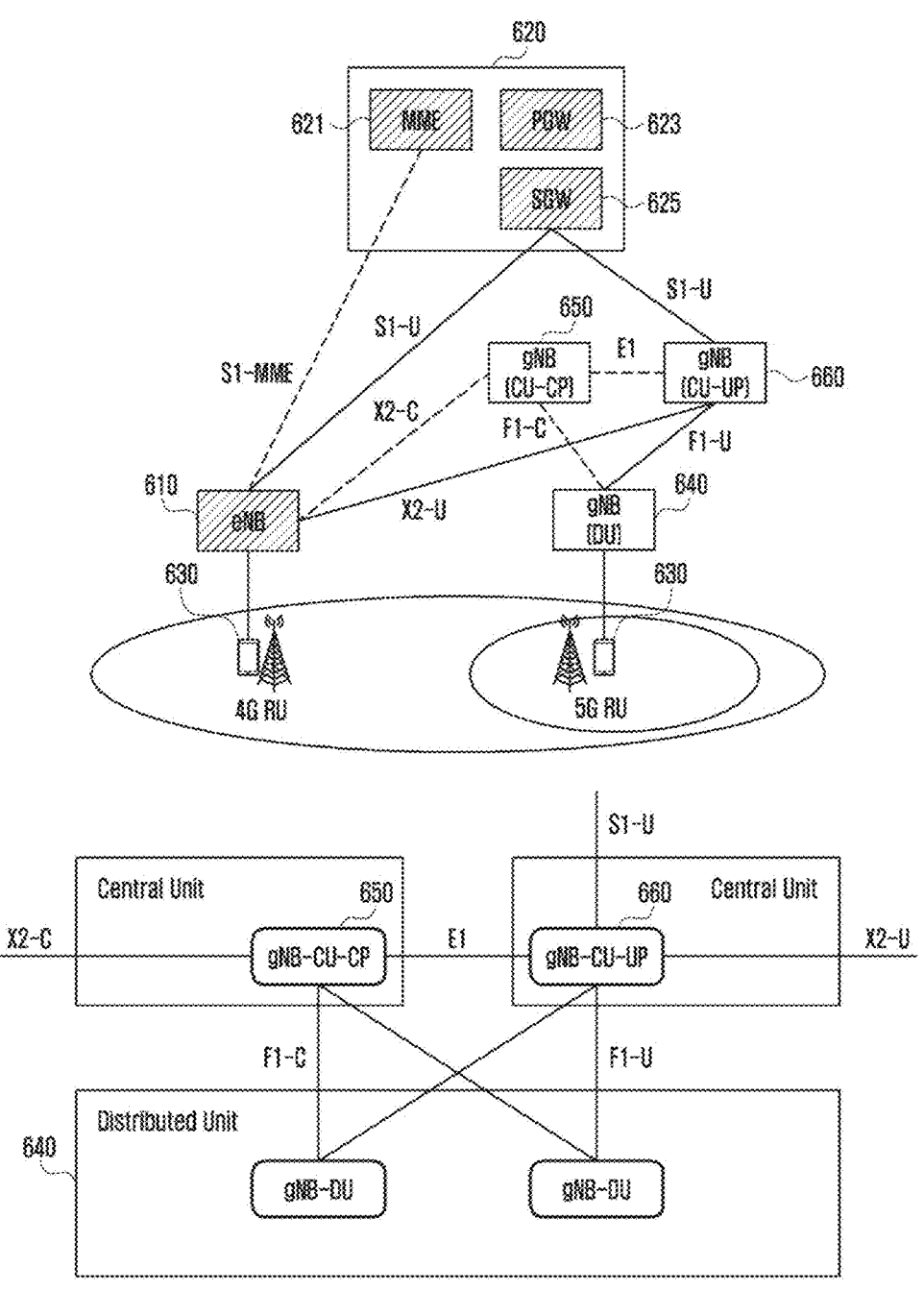
FIG. 6A is a diagram showing the structure of network elements included in a wireless communication system supporting EN-DC according to an embodiment of the disclosure.

FIG. 6A is a diagram showing the structure of network elements included in a wireless communication system supporting EN-DC according to an embodiment of the disclosure.

Terms described in TS 38.401, that is, a gNB central unit (gNB-CU), a gNB-CU-control plane (gNB-CU-CP), a gNB-CU-user plane (gNB-CU-UP), and a gNB distributed unit (gNB-DU) may correspond to a central unit (CU) included in a base station supporting 5G system, a central unit-control plane (CU-CP) included in the base station, a central unit-user plane (CU-UP) included the base station, and a distributed unit (DU) included in the base station.

In this specification, the gNB-CU-control plane (gNB-CU-CP), the gNB-CU-user plane (gNB-CU-UP), and the gNB distributed unit (gNB-DU) may be indicated as the CU-CP, the CU-UP, and the DU, respectively.

gNB Central Unit (gNB-CU): a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU.

gNB Distributed Unit (gNB-DU): a logical node hosting RLC, MAC and PHY layers of the gNB or en-gNB, and its operation is partly controlled by gNB-CU. One gNB-DU supports one or multiple cells. One cell is supported by only one gNB-DU. The gNB-DU terminates the F1 interface connected with the gNB-CU.

gNB-CU-Control Plane (gNB-CU-CP): a logical node hosting the RRC and the control plane part of the PDCP protocol of the gNB-CU for an en-gNB or a gNB. The gNB-CU-CP terminates the E1 interface connected with the gNB-CU-UP and the F1-C interface connected with the gNB-DU.

gNB-CU-User Plane (gNB-CU-UP): a logical node hosting the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU.

In this specification, the gNB-CU-control plane (gNB-CU-CP), the gNB-CU-user plane (gNB-CU-UP), and the gNB distributed unit (gNB-DU) may be indicated as the CU-CP, the CU-UP, and the DU, respectively.

In this specification, CU-CP and CU-UP may be indicated as a network device (entity) implementing CU-CP and a network device (entity) implementing CU-UP, respectively.

The present invention features a central unit controlling an operation of a distributed unit through signaling. The realization of the central unit and distributed unit is not confined to the above example.

Figure 6B:
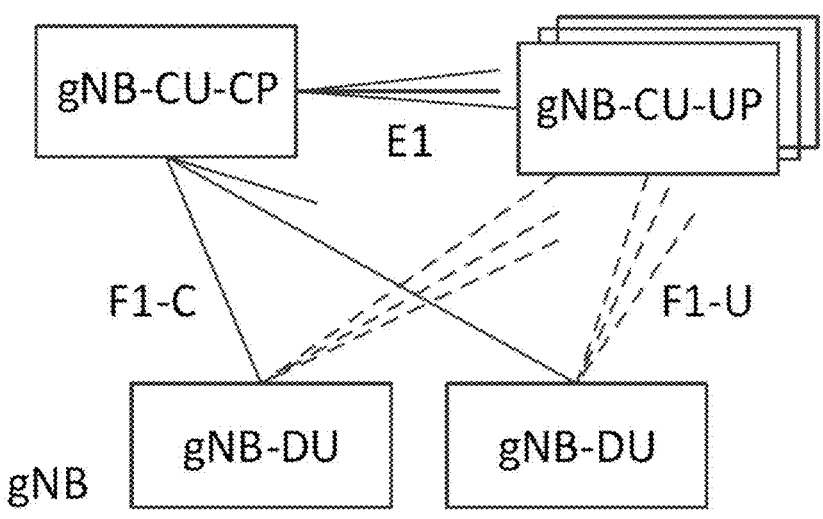
FIG. 6B is a diagram illustrating a realization of central unit-control plane (CU-CP), central unit-user plane (CU-UP), and distributed unit (DU)

For example, the realization of the "CU-CP, CU-UP, and DU" illustrated in FIG. 6B relates to one embodiment of the invention and is not confined to the feature illustrated in FIG. 6B.

A central unit and a distributed unit can be realized in one base station. Or the distributed unit can be realized as a separate device from the base station.

In addition, in the invention, the central unit and distributed unit may be in a virtualized structure where the CU and DU are separated. Or they may be in a non-virtualized structure where they are not separated. In a non-virtualized structure, an operation can be achieved through control signaling within a base station. However, in a virtualized structure, it is necessary to define F1-C Interface/F1-U Interface operations and messages, for the purpose of signaling between the central unit and distributed unit as in FIG. 6B.

In addition, the central unit may be in a virtualized structure where a device achieving the CP and a device achieving the UP are separated. Or it can be in a non-virtualized structure where there is no distinction between the CP and UP and they are of one device. In a non-virtualized structure, an operation can be performed through control signaling within a base station. However, in a virtualized structure, as can be seen in FIG. 6B, it is necessary to define E1 Interface operations and messages for signaling between a device realizing the CP and a device realizing the UP.

In this specification, a gNB central unit (gNB-CU), a gNB-CU-control plane (gNB-CU-CP), a gNB-CU-user plane (gNB-CU-UP), and a gNB distributed unit (gNB-DU) may correspond to a central unit (CU) included in a secondary node (SN) (or secondary gNB (SgNB)), a central unit-control plane (CU-CP) included in a secondary node (SN) (or secondary gNB (SgNB)), a central unit-user plane (CU-UP) included in a secondary node, and a distributed unit (DU) included in a secondary node in an EN-DC system disclosed in this specification.

Referring to FIG. 6A, a 4G eNB is configured with one network element (NE), and a 5G gNB is configured with a CU-CP, a CU-UP, and a DU, that is, three network elements.

As shown in FIG. 6A, the CU-CP that is a control plane, the CU-UP that is a user plane, and the DU including MAC/RLC/PHY layers may be connected to an E1, an F1 Control plane interface (F1-C)/F1 user plane interface (F1-U), that is, external interfaces, respectively.

Figure 7:
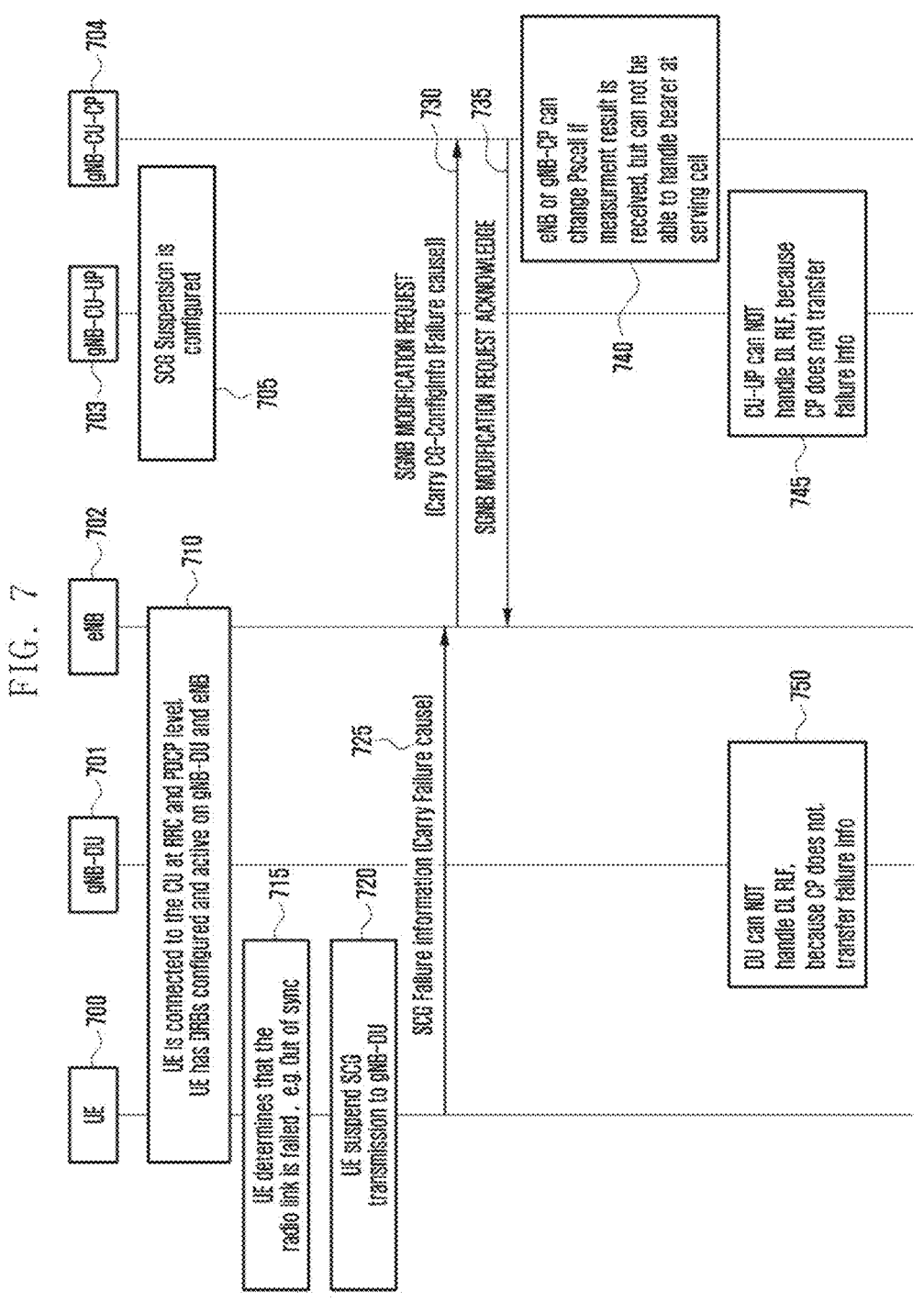
FIG. 7 is a diagram illustrating an operation of a SN in the case where a radio link failure (RLF) occurs in the SN in an existing wireless communication system supporting dual connectivity according to an embodiment of the disclosure.

FIG. 7 is a diagram illustrating an operation of a SN when a radio link failure (RLF) occurs in an existing wireless communication system supporting dual connectivity according to an embodiment of the disclosure.

Referring to FIG. 7, at operation 705, a gNB-CU-UP configures a suspension operation to be in an On state. FIG. 7 illustrates a UE 700, a gNB-DU 701, an eNB 702, a gNB-CU-UP 703, and a gNB-CU-CP 704.

At operation 710, a terminal (UE) is connected to a CU at an RRC and PDCP level in an EN-DC structure, and the UE is in a state where it is connected to a gNB-DU and an eNB.

At operation 715, the UE may detect a radio link failure (RLF).

The UE may detect whether a specific event related to a MAC occurs, and the MAC related event may include the radio link failure (RLF).

That is, the UE detect the occurrence of the RLF.

For example, if a T310 timer or a T310s timer expires, it may be determined that the RLF is detected.

For example, if a T310 timer or a T304 timer expires, and random access problem, RLC that the maximum number of retransmissions, RRC message decoding error, or RRC message Integrity failure, it may be determined that the RLF is detected.

Meanwhile, the UE checks whether the RLF occurs in MCG or SCG.

Occurrence of the RLF in MCG (MCG-RLF) means that a state where a channel quality of a specific cell (e.g., PCell) among serving cells belonging to the MCG is equal to or lower than a specific reference level continues over another specific time period.

That is, the MCG-RLF occurs due to a problem of an MCG serving cell, and in particular, the MCG-RLF occurs if the state where the channel state of PSCell is equal to or lower than the specific reference level continues over the specific reference time period.

Occurrence of the RLF in SCG (SCG-RLF) means that a state where a channel quality of a specific cell (e.g., PSCell) among serving cells belonging to the SCG is equal to or lower than a specific reference level continues over another specific time period.

That is, the SCG-RLF occurs due to a problem of a SCG serving cell, and in particular, the SCG-RLF occurs if the state where the channel state of PSCell is equal to or lower than the specific reference level continues over the specific reference time period. Here, the channel quality may mean a reception quality of a PDCCH channel.

Meanwhile, the occurrence of the RLF in the MCG means that the UE is unable to keep the current RRC connection any more, and thus the UE rushes into an RRC connection reestablishment procedure.

Further, the occurrence of the RLF in the SCG means that data transmission and reception is not possible in the SCG. However, even in this case, a normal communication is possible through the MCG.

In this specification, the occurrence of the RLF in a SN may be used as the same meaning as that of the occurrence of the RLF in the SCG, the SCG-RLF or the SCG failure.

At operation 720, if the RLF occurrence is determined, the UE may suspend the SCG transmission to the gNB-DU.

If the SCG-RLF occurrence is determined at operation 715, the UE suspends uplink transmission of SCell and PSCell included in the SCG. In this case, the UE keeps the SCG serving cell and PSCell without releasing. This is to refer to the current configuration in the case of reconfiguring the SCG serving cell thereafter. That is, if the RLF is determined in relation to the SCG, the UE may stop the SCG transmission to the gNB-DU.

At operation 725, if the SCG-RLF occurrence is determined, the UE may generate and transmit information related to the RLF to the master base station (MeNB) through the MCG serving cell.

For example, the information related to the RLF may include information reporting the occurrence of the SCG-RLF (e.g., SCG failure information) or measurement information of neighboring cells of the SCG serving cell frequency.

Further, the SCG failure information may include failure cause (e.g., out of sync) information.

At operation 730, the master base station (MeNB) may transfer information related to the RLF (e.g., SCG failure information) that is received from the UE to the CU-CP (SgNB-CU-CP) included in the secondary base station.

For example, the master base station (MeNB) may transfer a SGNB MODIFICATION REQUEST including the SCG failure information to the CU-CP (SgNB-CU-CP) included in the secondary base station.

Further, the SCG failure information may include failure cause (e.g., out of sync) information.

At operation 735, if the SGNB MODIFICATION REQUEST is received, the SgNB-CU-CP may transmit a SGNB MODIFICATION REQUEST ACKNOWLEDGE to the MeNB as a response.

At operation 740, if the SCG failure occurs, the MeNB or the SgNB-CU-CP can perform the PScell change.

However, as illustrated, if the SCG failure occurs at operation 740, the SgNB-CU-CP is unable to perform a control operation of a data radio bearer (DRB) and a signaling radio bearer (SRB) for the existing serving cell.

Further, if the SCG failure occurs in the existing wireless communication system supporting dual connectivity, there is no signaling whereby the gNB-CU-CP transmits the SCG failure information to the gNB-CU-UP or the gNB-DU, and thus the gNB-CU-UP or the gNB-DU is unable to perform the process related to the SCG failure occurrence.

Accordingly, if the SCG failure occurs, the gNB-CU-UP or the gNB-DU is unable to perform a SCG keep operation that is an operation of keeping a UE context, a bearer context, or a cell context. That is, when the SCG failure occurs, the gNB-CU-UP or the gNB-DU is unable to keep the SCG serving cell and PSCell without releasing the same.

Accordingly, as indicated at operation 745, the gNB-CU-UP is unable to receive the SCG failure information from the gNB-CU-CP, and thus it is unable to perform a separate handling operation when the SCG failure occurs.

In the same manner, at operation 750, the gNB-DU is unable to receive the SCG failure information from the gNB-CU-CP, and thus it is unable to perform the separate handling operation when the SCG failure occurs.

As described above, if the SCG failure occurs in the existing wireless communication system supporting the dual connectivity, the gNB-CU-UP and the gNB-DU are unable to perform a separate process related to the SCG-RLF.

Figure 8:
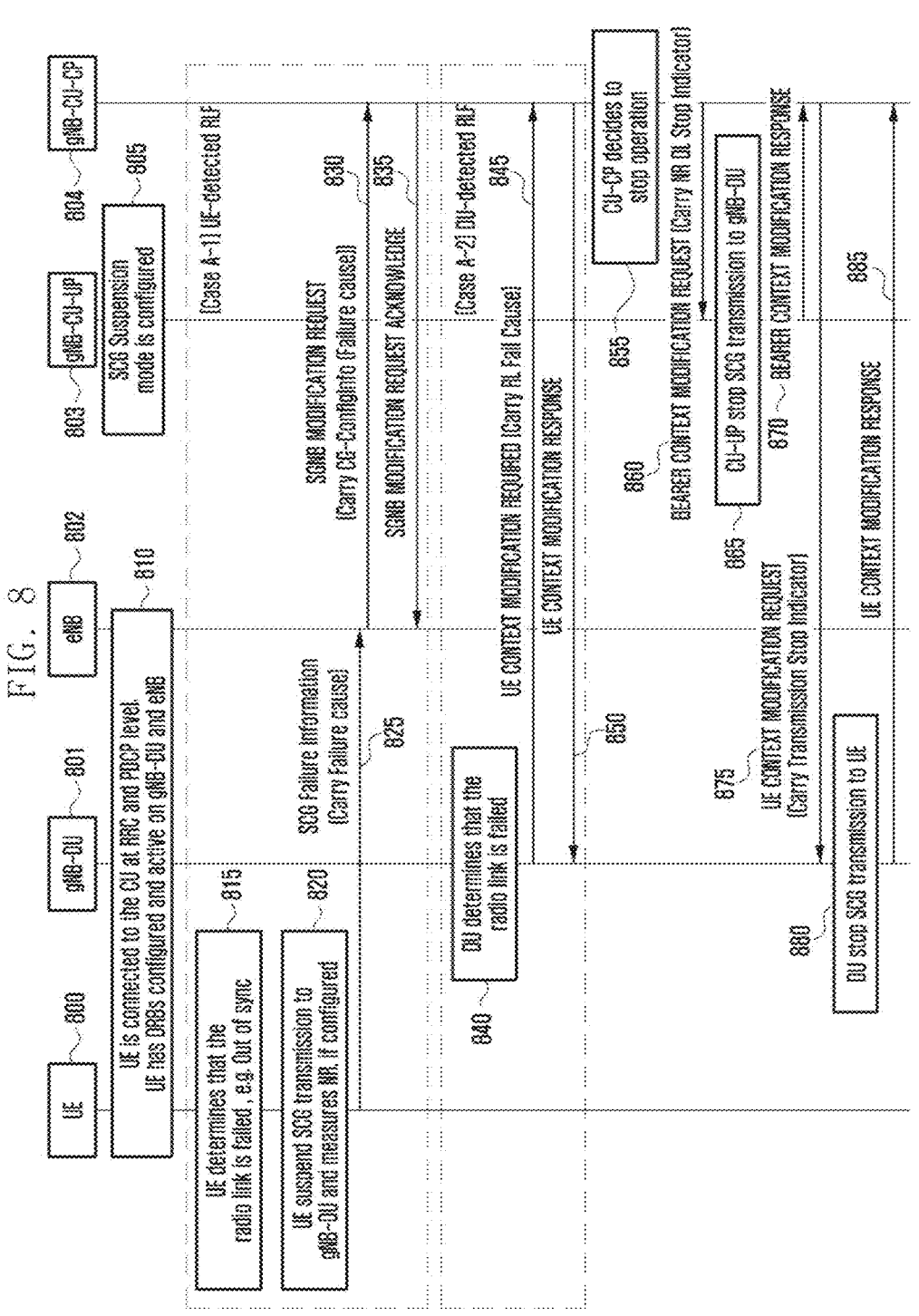
FIG. 8 is a diagram illustrating an operation of a SN in the case where a radio link failure (RLF) occurs in the SN (SCG-RLF) in a wireless communication system supporting dual connectivity according to an embodiment of the disclosure.

FIG. 8 is a diagram illustrating an operation of a SN in the case where a radio link failure (RLF) occurs (SCG-RLF) in the SN in a wireless communication system supporting dual connectivity according to an embodiment of the disclosure.

Referring to FIG. 8, at operation 805, a gNB-CU-UP configures a suspension operation to be in an On state. FIG. 8 illustrates a UE 800, a gNB-DU 801, an eNB 802, a gNB-CU-UP 803, and a gNB-CU-CP 804.

At operation 810, a UE is connected to a CU at an RRC and PDCP level in an EN-DC structure, and the UE is in a state where it is connected to a gNB-DU and an eNB.

Referring to FIG. 8, Case A-1 is a case where the UE detects an RLF, and an operation in the corresponding case is as follows.

At operation 815, the UE may detect the occurrence of SCG-RLF (e.g., out of sync).

At operation 820, if the SCG-RLF is determined, the UE may suspend the SCG transmission to the gNB-DU.

At operation 825, if the SCG-RLF is determined, the UE may transmit information related to the RLF (SCG failure information) to the MeNB.

For example, the SCG failure information may include failure cause (e.g., out of sync) information.

At operation 830, the MeNB transfers a SGNB MODIFICATION REQUEST including information related to the RLF received from the UE (SCG failure information) to the SgNB-CU-CP.

For example, the SCG failure information may include failure cause (e.g., out of sync) information.

At operation 835, if the SGNB MODIFICATION REQUEST is received, the SgNB-CU-CP may transmit a SGNB MODIFICATION REQUEST ACKNOWLEDGE to the MeNB as a response.

As illustrated in FIG. 8, Case A-2 is a case where the gNB-DU detects the RLF, and an operation in the corresponding case is as follows.

At operation 840, the gNB-DU detects the occurrence of the radio link failure (hereinafter, RLF) (e.g., out of sync).

At operation 845, the gNB-DU may transfer a UE CONTEXT MODIFICATION REQUIRED including the information related to the RLF to the SgNB-CU-CP.

For example, the RLF related information may include failure cause (e.g., radio link fail) information.

At operation 850, if the UE CONTEXT MODIFICATION REQUIRED is received, the gNB-CU-CP may transmit the SGNB MODIFICATION REQUEST ACKNOWLEDGE to the MeNB as a response.

As illustrated in FIG. 8, only one or both of Case A-1 and Case A-2 as described above may occur at the same time, and a subsequent operation after the case occurrence is as follows.

At operation 855, the gNB-CU-CP may detect the occurrence of the SCG failure based on the information related to the received RLF, and it may determine stop operation of the downlink transmission with respect to the existing serving cell.

At operation 860, the gNB-CU-CP may transmit a BEARER CONTEXT MODIFICATION REQUEST including information indicating the downlink transmission stop (NR DL stop indicator) of the gNB-CU-UP.

At operation 865, if the information indicating the downlink transmission stop (NR DL stop indicator) is received, the gNB-CU-UP may stop the downlink transmission to the gNB-DU with respect to the corresponding SCG bearer. Further, if necessary, the gNB-CU-UP may perform a path switching and retransmission operation to the MeNB.

At operation 870, the gNB-CU-UP may transmit a BEARER CONTEXT MODIFICATION RESPONSE to the gNB-CU-CP in response to the BEARER CONTEXT MODIFICATION REQUEST.

At operation 875, the gNB-CU-CP may transmit a UE CONTEXT MODIFICATION REQUEST including information indicating downlink transmission stop of the gNB-DU (transmission stop indicator) to the gNB-DU.

At operation 880, if the information indicating the downlink transmission stop (transmission stop indicator) is received, the gNB-DU may stop the downlink transmission to the UE with respect to the corresponding SCG bearer.

At operation 885, the gNB-DU may transmit a UE CONTEXT MODIFICATION RESPONSE to the gNB-CU-CP in response to the UE CONTEXT MODIFICATION REQUEST.

Referring to FIG. 8, the operation 860 in which the gNB-CU-CP transmits information indicating the downlink transmission stop of the gNB-CU-UP and the operation 875 in which the gNB-CU-CP transmits the information indicating the transmission of the gNB-DU (transmission stop indicator) to the gNB-DU are not limited to their operation order as described above, and the operation 875 may be performed prior to the operation 860, or the operations 860 and 875 may be simultaneously performed in parallel.

Figure 9:
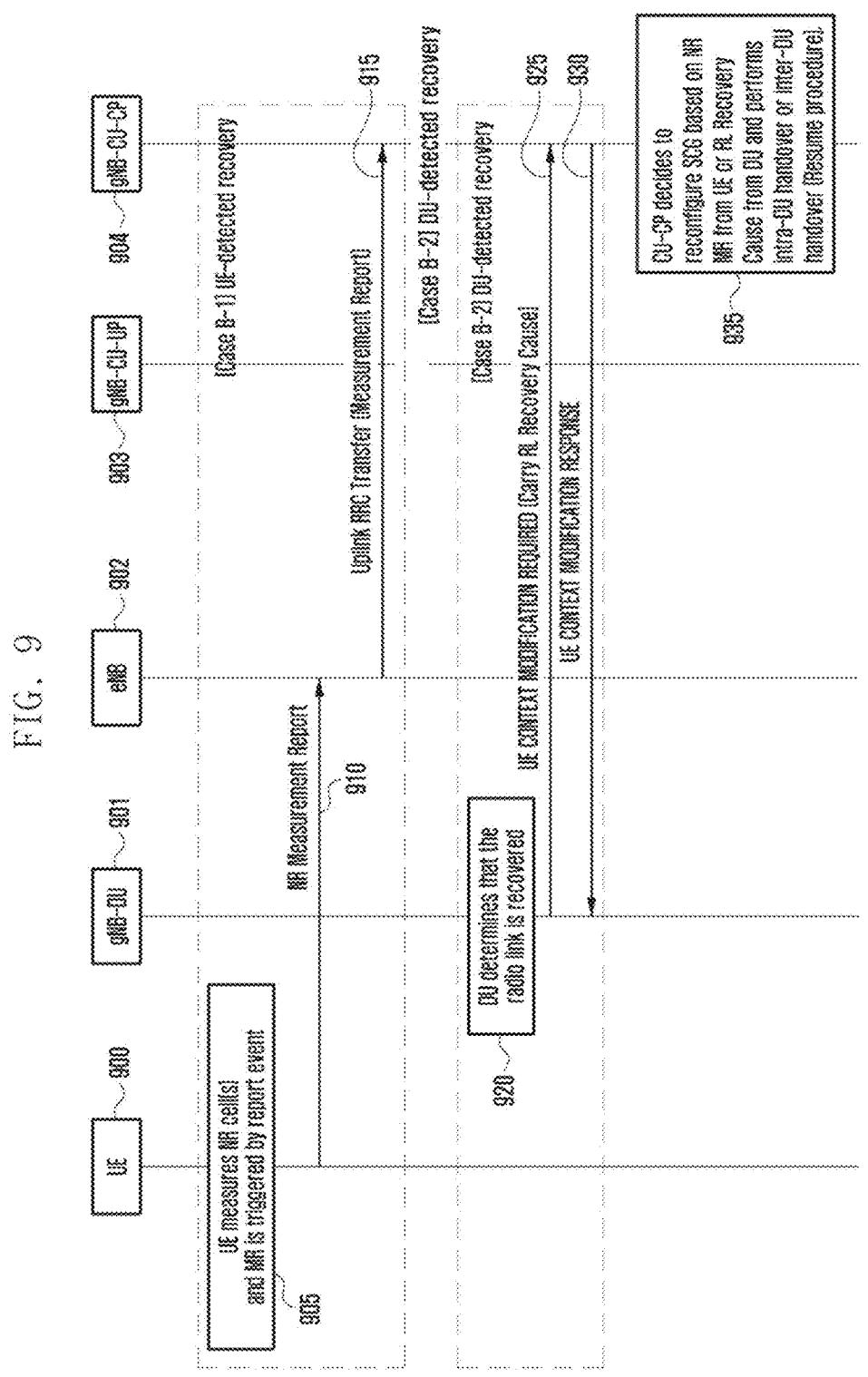
FIG. 9 is a diagram illustrating an operation of a SN in the case where a radio link (RL) recovery occurs in the SN (SCG-RL recovery) in a wireless communication system supporting EN-DC according to an embodiment of the disclosure.

FIG. 9 is a diagram illustrating an operation of a SN in the case where a radio link (RL) recovery occurs in the SN (SCG-RL recovery) in a wireless communication system supporting EN-DC according to an embodiment of the disclosure.

Referring to FIG. 9, Case B-1 is a case where a UE detects normal recovery of a radio link, and an operation in the corresponding case is as follows. FIG. 9 illustrates a UE 900, a gNB-DU 901, an eNB 902, a gNB-CU-UP 903, and a gNB-CU-CP 904.

At operation 905, the UE may perform a measurement with respect to at least one cell (NR cell) related to a secondary base station.

At operation 910, if a report event is triggered during the measurement, the UE may transmit a measurement report (MR) to a master base station (eNB). For example, if an event in which a radio link of PSCell of the SN is recovered to a normal signal value occurs, the MR may be triggered.

At operation 915, the master base station (eNB) may transmit the measurement report (NR MR) received from the UE to the secondary base station (gNB).

As illustrated in FIG. 9, Case B-2 is a case where a DU detects normal recovery of a radio link, and an operation in the corresponding case is as follows.

At operation 920, a gNB-DU may detect the normal recovery of the radio link.

At operation 925, the gNB-DU may transmit a UE CONTEXT MODIFICATION REQUIRED including information related to the radio link recovery (RL recovery information) to a gNB-CU-CP.

At operation 930, the gNB-CU-CP may transmit a UE CONTEXT MODIFICATION RESPONSE to the gNB-DU in response to the UE CONTEXT MODIFICATION REQUIRED.

As illustrated in FIG. 9, only one or both of Case B-1 and Case B-2 as described above may occur at the same time, and a subsequent operation after the occurrence of the case is as follows.

At operation 935, if MR is received from the UE, or if RL recovery information is received from the DU, the gNB-CU-CP may determine that the radio link is recovered in the SN, and it may determine an operation of resuming the downlink transmission with respect to the existing serving cell or a new serving cell.

For example, the resuming operation with respect to an existing serving cell or another neighboring cell in the same DU may include an operation of performing an intra-DU handover, and the resuming operation with respect to a neighboring cell in another DU may include an operation of performing an inter-DU handover.

Figure 10:
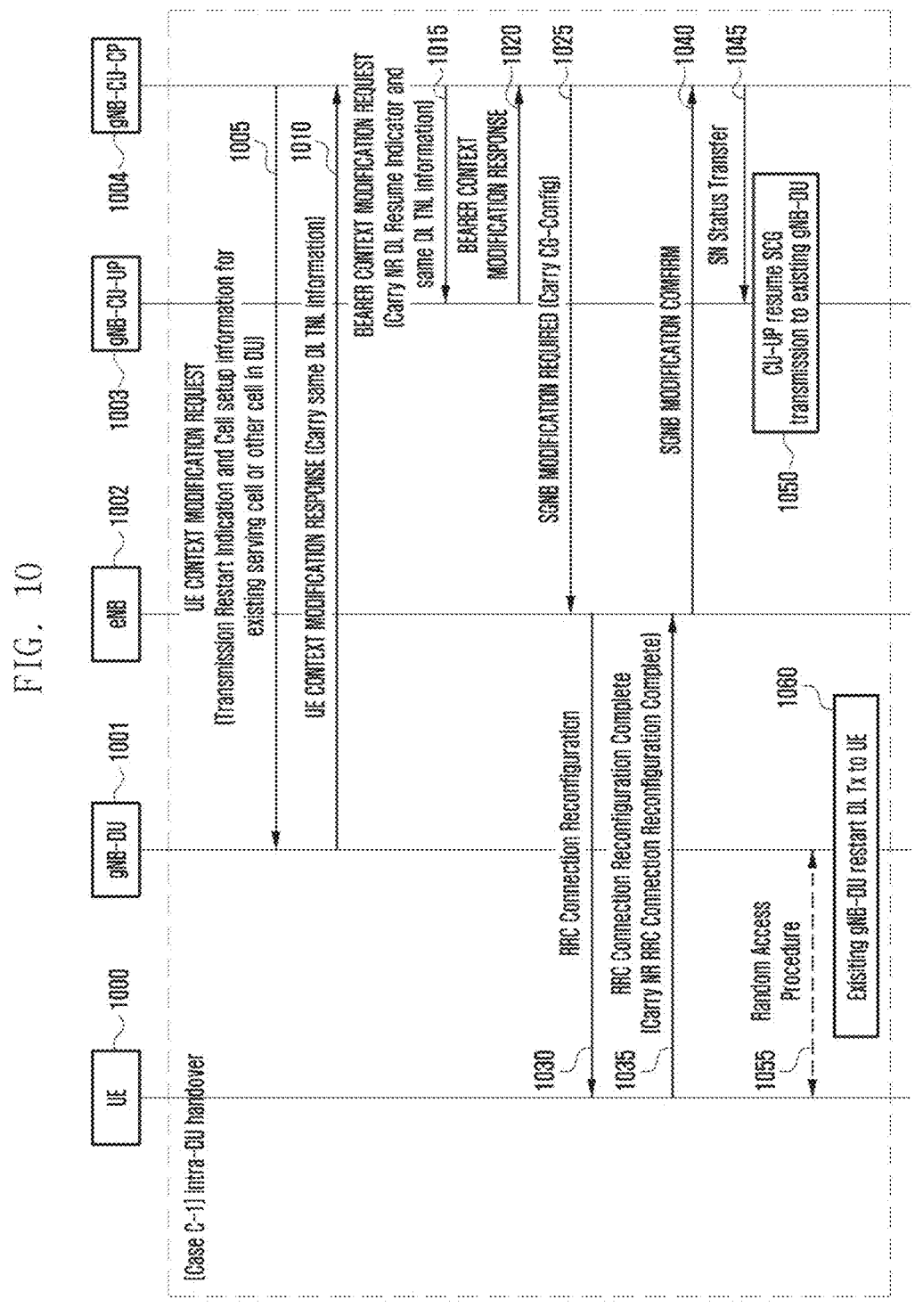
FIG. 10 is a diagram illustrating an operation of a SN to resume downlink transmission with respect to a serving cell within the same DU in the SN in a wireless communication system supporting dual connectivity according to an embodiment of the disclosure.

FIG. 10 is a diagram illustrating an operation of a SN to resume downlink transmission with respect to a serving cell within the same DU in the SN in a wireless communication system supporting dual connectivity according to an embodiment of the disclosure.

Referring to FIG. 10, Case C-1 is a case where handover to one of cells in a DU including an existing serving cell is performed, and an operation in the corresponding case is as follows. FIG. 10 illustrates a UE 1000, a gNB-DU 1001, an eNB 1002, a gNB-CU-UP 1003, and a gNB-CU-CP 1004.

At operation 1005, a gNB-CU-CP may transmit, to a gNB-DU, information indicating transmission resume of the gNB-DU (transmission restart indication) and cell setup information for the existing serving cell or another cell in the DU.

At operation 1010, the gNB-DU may transmit a UE CONTEXT MODIFICATION RESPONSE including existing DL transport network layer (TNL) information to the gNB-CU-CP.

At operation 1015, the gNB-CU-CP may transmit, to the gNB-CU-CP, a BEARER CONTEXT MODIFICATION REQUEST including information indicating downlink transmission resume of the gNB-CU-UP (NR DL resume indicator) and DL TNL information received from the DU.

At operation 1020, the gNB-CU-UP may transmit a BEARER CONTEXT MODIFICATION RESPONSE to the gNB-CU-CP in response to the BEARER CONTEXT MODIFICATION REQUEST.

At operation 1025, the gNB-CU-CP may transmit a SGNB MODIFICATION REQUIRED including cell (NR cell) information related to a secondary base station and bearer information to a master base station (eNB).

At operation 1030, the eNB may transmit an RRC connection reconfiguration including the NR cell information and the bearer information to the UE.

At operation 1035, the UE may transmit an RRC connection reconfiguration complete to the eNB in response to the RRC connection reconfiguration.

At operation 1040, the eNB may transmit a SGNB MODIFICATION CONFIRM to the gNB-CU-CP in response to the SGNB MODIFICATION REQUIRED.

At operation 1045, the gNB-CU-CP may transmit a sequence number (SN) status transfer to the gNB-CU-UP.

At operation 1050, the gNB-CU-UP may resume SCG transmission to the existing gNB-DU.

For example, the SCG transmission means the downlink transmission of the gNB-CU-UP with respect to the SCG bearer, and at operation 1050, the gNB-CU-UP may resume the downlink transmission to the existing gNB-DU with respect to the corresponding SCG bearer.

At operation 1055, if the RRC connection reconfiguration including the NR cell information and the bearer information is received, the UE may perform a random access procedure with the corresponding NR cell.

At operation 1060, the existing gNB-DU may resume the downlink transmission to the UE.

Further, although not illustrated in the drawing, the existing gNB-DU may resume the transmission to the UE with respect to the corresponding SCG bearer.

Referring to FIG. 10, the operation 1005 in which the gNB-CU-CP transmits information indicating the downlink transmission resume of the gNB-DU (transmission restart indicator) to the gNB-DU and the operation 1015 in which the gNB-CU-CP transmits the information indicating the downlink transmission resume of the gNB-CU-UP (NR DL resume indicator) to the gNB-CU-UP are not limited to their operation order as described above, and the operation 1015 may be performed prior to the operation 1005, or the operations 1005 and 1015 may be simultaneously performed in parallel.

Figure 11:
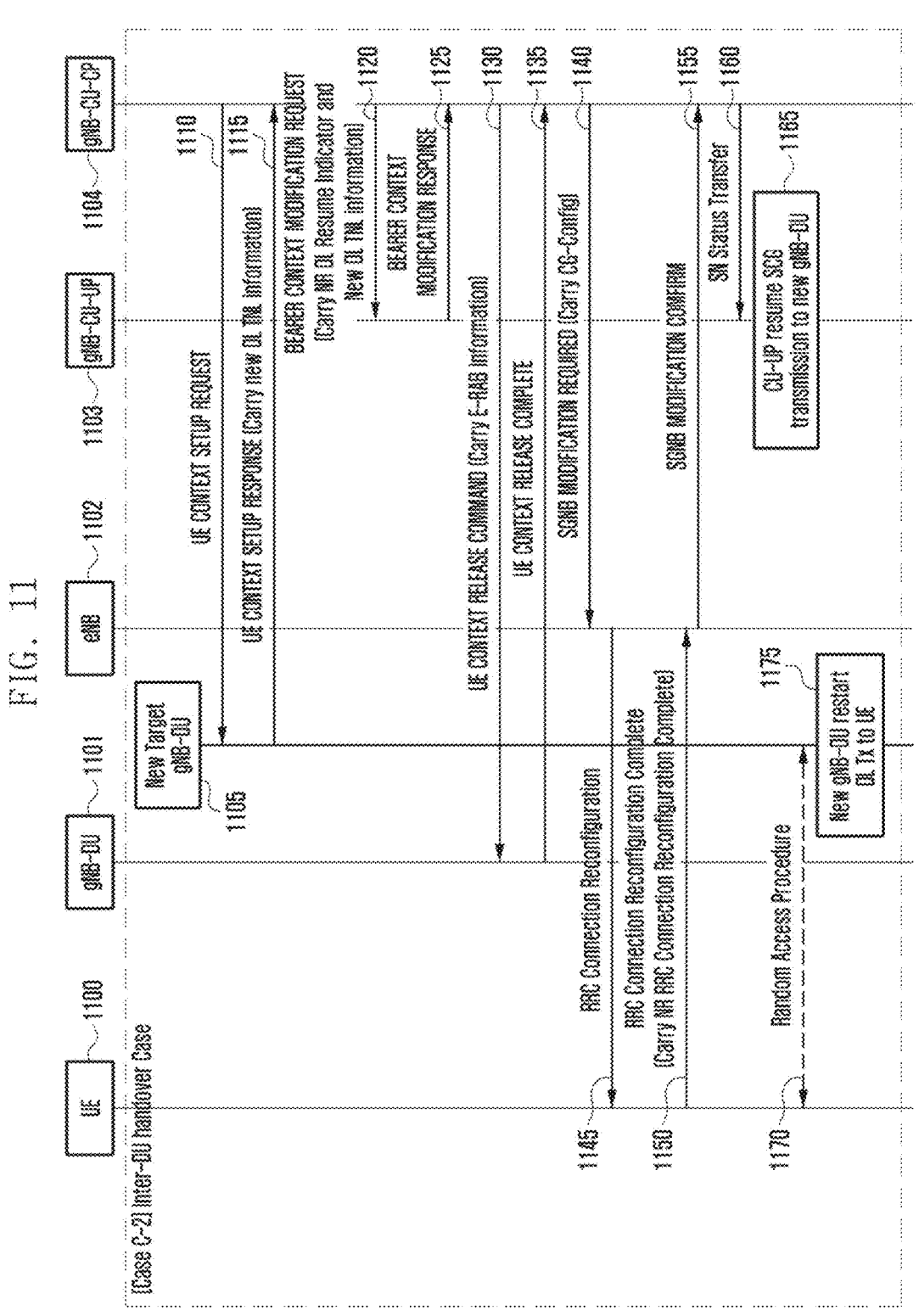
FIG. 11 is a diagram illustrating an operation of a SN to resume downlink transmission with respect to a serving cell within another DU in the SN in a wireless communication system supporting dual connectivity according to an embodiment of the disclosure.

FIG. 11 is a diagram illustrating an operation of a SN to resume downlink transmission with respect to a serving cell within another DU in the SN in a wireless communication system supporting dual connectivity according to an embodiment of the disclosure.

Referring to FIG. 11, Case C-2 is a case where handover to one of cells of another DU is performed, and an operation in the corresponding case is as follows. FIG. 11 illustrates a UE 1100, a gNB-DU 1101, an eNB 1102, a gNB-CU-UP 1103, and a gNB-CU-CP 1104.

At operation 1110, a gNB-CU-CP 1105 may transmit a UE CONTEXT SETUP REQUEST to a gNB-DU for UE setup.

At operation 1115, a target gNB-DU may transmit a UE CONTEXT MODIFICATION RESPONSE including new DL TNL information to the gNB-CU-CP.

At operation 1120, the gNB-CU-CP may transmit a BEARER CONTEXT MODIFICATION REQUEST including information indicating downlink transmission resume of the gNB-CU-UP (NR DL resume indicator) and the DL TNL information received from the target gNB-DU to the gNB-CU-UP.

At operation 1125, the gNB-CU-UP may transmit a BEARER CONTEXT MODIFICATION RESPONSE to the gNB-CU-CP in response to the BEARER CONTEXT MODIFICATION REQUEST.

At operation 1130, the gNB-CU-CP may transmit a UE CONTEXT RELEASE COMMAND for releasing the UE configuration information to the existing gNB-DU.

At operation 1135, the existing gNB-DU may release the corresponding UE configuration, and it may transmit a UE CONTEXT RELEASE COMPLETE.

At operation 1140, the gNB-CU-CP may transmit a SGNB MODIFICATION REQUIRED including the NR cell information and the bearer information to the master base station (eNB).

At operation 1145, the master base station (eNB) may transmit an RRC connection reconfiguration including the NR cell information and the bearer information to the UE.

At operation 1150, the UE may transmit an RRC connection reconfiguration complete to the eNB in response to the RRC connection reconfiguration.

At operation 1155, the eNB may transmit a SGNB MODIFICATION CONFIRM to the gNB-CU-CP in response to the SGNB MODIFICATION REQUIRED.

At operation 1160, the gNB-CU-CP may transmit the SN status transfer message to the gNB-CU-UP.

At operation 1165, the gNB-CU-UP may resume the SCG transmission to the target gNB-DU.

At operation 1170, if the RRC connection reconfiguration including the NR cell and bearer information is received, the UE may perform a random access procedure with the corresponding NR cell.

At operation 1175, the target gNB-DU may resume the downlink transmission to the UE 1100.

Only one of case C-1 and case C-2 as illustrated in FIGS. 10 to 11 may occur.

Although the above-described flowcharts are flowcharts between the MeNB and the SgNB in the EN-DC structure, the transmission stop/resume configuration operation to the DU performed by the CU-CP with respect to the CU-UP or the transmission stop/resume configuration information to the UE performed by the CU-CP with respect to the DU disclosed in this specification may be applied in the same manner even in the MR-DC, NR-DC, or SA NR.

FIG. 12 is a diagram illustrating an operation in which a CU-UP or a DU suspends downlink transmission in the case where a radio link failure (RLF) occurs in a SN in a wireless communication system supporting dual connectivity according to an embodiment of the disclosure.

FIG. 12 illustrates an embodiment in which a CU-CP transmits information indicating downlink transmission stop to a CU-UP or a DU if a UE detects SCG-RLF. FIG. 12 illustrates a UE 1200, an MeNB 1201, an SgNB-DU 1202, an SgNB-CU-UP 1203 and an SgNB-CU-CP 1204.

Referring to FIG. 12, at operation 1205, a UE may detect the occurrence of SCG-RLF (e.g., out of sync).

Although not illustrated in the drawing, if the SCG-RLF is determined, the UE may stop SCG transmission to a gNB-DU.

At operation 1210, if the SCG-RLF is determined, the UE may transmit information related to the RLF (SCG failure information) to a MeNB.

For example, the SCG failure information may include failure cause (e.g., out of sync) information.

At operation 1215, the MeNB may transfer a SGNB MODIFICATION REQUEST including information related to the RLF received from the UE (SCG failure information) to a SgNB-CU-CP.

For example, the SCG failure information may include failure cause (e.g., out of sync) information.

At operation 1220, if the SGNB MODIFICATION REQUEST is received, the SgNB-CU-CP may transmit a SGNB MODIFICATION REQUEST ACKNOWLEDGE to the MeNB as a response.

At operation 1225, if the SCG failure occurrence is detected, the gNB-CU-CP may keep a SCG serving cell and PSCell without releasing the same based on the information related to the received RLF, and it may determine the stop of the downlink transmission of the CU-UP and the DU with respect to the existing serving cell.

At operation 1230, the gNB-CU-CP may transmit a BEARER CONTEXT MODIFICATION REQUEST including information indicating the downlink transmission stop of the gNB-CU-UP (DL stop indicator) to the gNB-CU-UP.

At operation 1235, if the information indicating the downlink transmission stop (DL stop indicator) is received, the gNB-CU-UP may stop the downlink transmission to the gNB-DU with respect to the corresponding SCG bearer. Further, if necessary, the gNB-CU-UP may perform a path switching and retransmission operation to the MeNB.

At operation 1240, the gNB-CU-UP may transmit a BEARER CONTEXT MODIFICATION RESPONSE to the gNB-CU-CP in response to the BEARER CONTEXT MODIFICATION REQUEST.

At operation 1245, the gNB-CU-CP may transmit a UE CONTEXT MODIFICATION REQUEST including information indicating downlink transmission stop of the gNB-DU (transmission stop indicator) to the gNB-DU.

At operation 1250, if the information indicating the downlink transmission stop (transmission stop indicator) is received, the gNB-DU may stop the transmission to the UE with respect to the corresponding SCG bearer.

At operation 1255, the gNB-DU may transmit a UE CONTEXT MODIFICATION RESPONSE to the gNB-CU-CP in response to the UE CONTEXT MODIFICATION REQUEST.

Referring to FIG. 12, the operation 1230 in which the gNB-CU-CP transmits information indicating the downlink transmission stop of the gNB-CU-UP to the gNB-CU-UP and the operation 1245 in which the gNB-CU-CP transmits the information indicating the transmission stop of the gNB-DU (transmission stop indicator) to the gNB-DU are not limited to their operation order as described above, and the operation 1245 may be performed prior to the operation 1230, or the operations 1230 and 1245 may be simultaneously performed in parallel.

The DL Tx Stop IE was introduced in Cell Group Information IE. The intention is to allow CU-CP to stop the CU-UP DL transmission to a specific cell group. One example of using this DL Tx Stop IE is when the CU-CP wants to remove SCG.

Except removing SCG, the CU-CP may stop DL TX of CU-UP to a specific cell group in some other cases, e.g.,

Case 1: SCG Failure

According to the 37.340, when the MN receives the SCG failure information from the UE, the MN "may decide to keep, change, or release the SN/SCG". In case that the CU-CP decides to keep SCG, the CU-CP of SN can decide to stop DL Tx of CU-UP to the SCG.

Case 2: DU Detects RLF

When the DU of SN detects the RLF, the DU can send the UE Context Modification Required message to indicate the failure. In this case, the CU-CP of SN can decide to stop DL Tx of CU-UP to the SCG.

Case 3: SN Initial PSCell Change Procedure

When PSCell change is initiated by SN, the SgNB can decides to stop DL Tx transmission from the UP since SgNB decides to stop the DL Tx of DU.

However, different from the case of removing SCG, in the above cases, the CU-CP may want to resume the DL Tx of the CU-UP later.

For example,

For Case 1: If SCG failure occurs, MN may decide to keep the SCG. After some while, the PSCell in the SCG may become better than before. In this case, the MN may decide to recover the SCG by re-adding the PSCell. Then, the SgNB-CU-CP can decide to resume DL Tx of SgNB-CU-UP and SgNB-DU. The flowchart is given in FIG. 13.

For Case 2, similar as Case 1, when UE reports the recovery of the PSCell through MeNB, the SgNB-CU-CP can decide to recover SCG can decide to recover SCG by re-adding the PSCell. Then, the SgNB-CU-CP can inform SgNB-CU-UP and SgNB-DU to resume the DL transmission.

For Case 3, it is similar to the case used for introducing "restart" codepoint for Transmission Stop Indicator IE in F1AP message, i.e., UE CONTEXT MODIFICA-TION REQUEST. Specifically, in the SN-initiated modification procedure, after SN sends the SgNB modification required message, the SgNB-CU-CP should send UE Context Modification Request with transmission Stop indicator to SgNB-DU, and Bearer Context Modification request with DL Tx Stop IE to SgNB-CU-UP. However, at the same time, if MN also initiates SgNB modification request procedure which collides with this SN initiated procedure, such SN initiated procedure should be regarded as failed while MN initiated SN modification procedure continues. In this case, the SgNB-CU-CP can resume the transmis-sion at both SgNB-CU-UP and SgNB-DU.

With the above consideration, we propose that after the DL Tx is stopped at CU-UP, the CU-CP is allowed to resume the DL Tx of CU-UP by setting DL TX Stop IE as "Resume".

Figure 13:
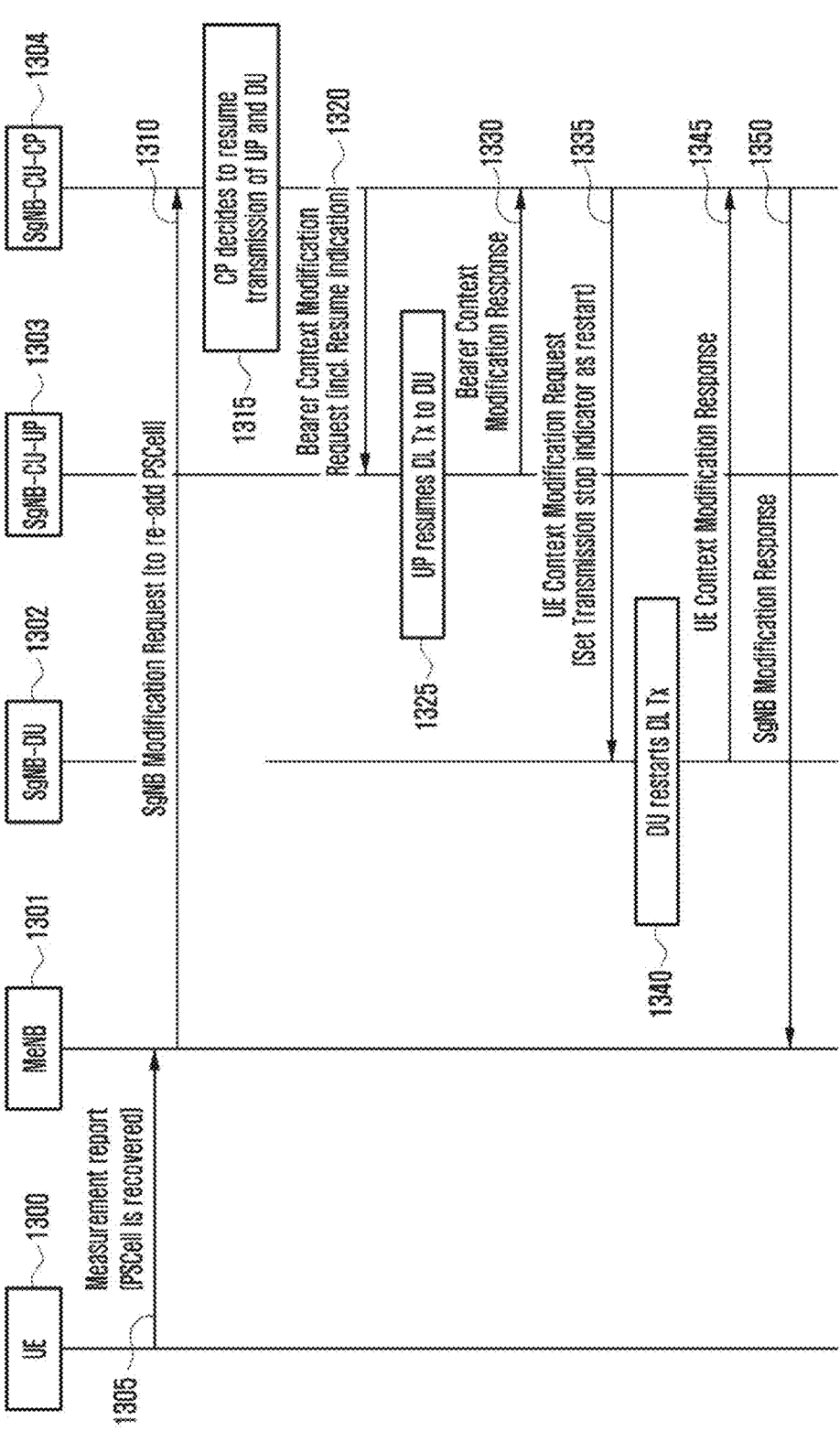
FIG. 13 is a diagram illustrating an operation in which a CU-UP or a DU resumes downlink transmission in the case where a radio link (RL) recovery occurs in a wireless communication system supporting dual connectivity according to an embodiment of the disclosure.

FIG. 13 is a diagram illustrating an operation in which a CU-UP or a DU resumes downlink transmission in the case where a radio link (RL) recovery occurs in a wireless communication system supporting dual connectivity accord-ing to an embodiment of the disclosure.

FIG. 13 illustrates an embodiment in which if a UE detects RL recovery, a CU-CP transmits information indi-cating downlink transmission resume to a CU-UP or a DU.

Although not illustrated in the drawing, the UE may perform a measurement with respect to at least one cell (NR cell) related to a secondary base station.

Referring to FIG. 13, at operation 1305, if a report event is triggered during the measurement, the UE may transmit a measurement report (MR) to a master base station (MeNB). FIG. 13 illustrates a UE 1300, an MeNB 1301, an SgNB-DU 1302, an SgNB-CU-UP 1303 and an SgNB-CU-CP 1304.

For example, if an event in which a radio link of PSCell is recovered to a normal signal value occurs, the MR may be triggered.

At operation 1310, the master base station (MeNB) may transmit the measurement report (NR MR) received from the UE to a secondary base station (SgNB).

For example, the master base station (MeNB) may trans-mit a SGNB MODIFICATION REQUEST in order to re-add the PSCell again.

At operation 1315, if the SGNB MODIFICATION REQUEST to add the PSCell is received, the gNB-CU-CP may determine that the radio link related to a specific cell (e.g., PSCell) among SCG serving cells is recovered, and it may determine an operation of resuming the downlink transmission of the CU-CP and the DU.

At operation 1320, the gNB-CU-CP may transmit a BEARER CONTEXT MODIFICATION REQUEST includ-ing information indicating the downlink transmission resume of the gNB-CU-UP (DL resume indicator) to the gNB-CU-UP.

At operation 1325, if the information indicating the down-link transmission resume (DL resume indicator) is received, the gNB-CU-UP may resume the downlink transmission to the gNB-DU with respect to the corresponding SCG bearer.

At operation 1330, the gNB-CU-UP may transmit a BEARER CONTEXT MODIFICATION RESPONSE to the gNB-CU-CP in response to the BEARER CONTEXT MODIFICATION REQUEST.

At operation 1335, the gNB-CU-CP may transmit a UE CONTEXT MODIFICATION REQUEST including infor-mation indicating downlink transmission resume of the gNB-DU (transmission restart indicator) to the gNB-DU.

At operation 1340, if the information indicating the down-link transmission resume (transmission restart indicator) is received, the gNB-DU may resume the downlink transmis-sion of the UE with respect to the corresponding SCG bearer.

At operation 1345, the gNB-DU may transmit a UE CONTEXT MODIFICATION RESPONSE to the gNB-CU-CP in response to the UE CONTEXT MODIFICATION REQUEST.

At operation 1350, the gNB-CU-CP may transmit an RRC SGNB MODIFICATION RESPONSE to the master base station (MeNB) in response to the SGNB MODIFICATION REQUEST.

Figure 14:
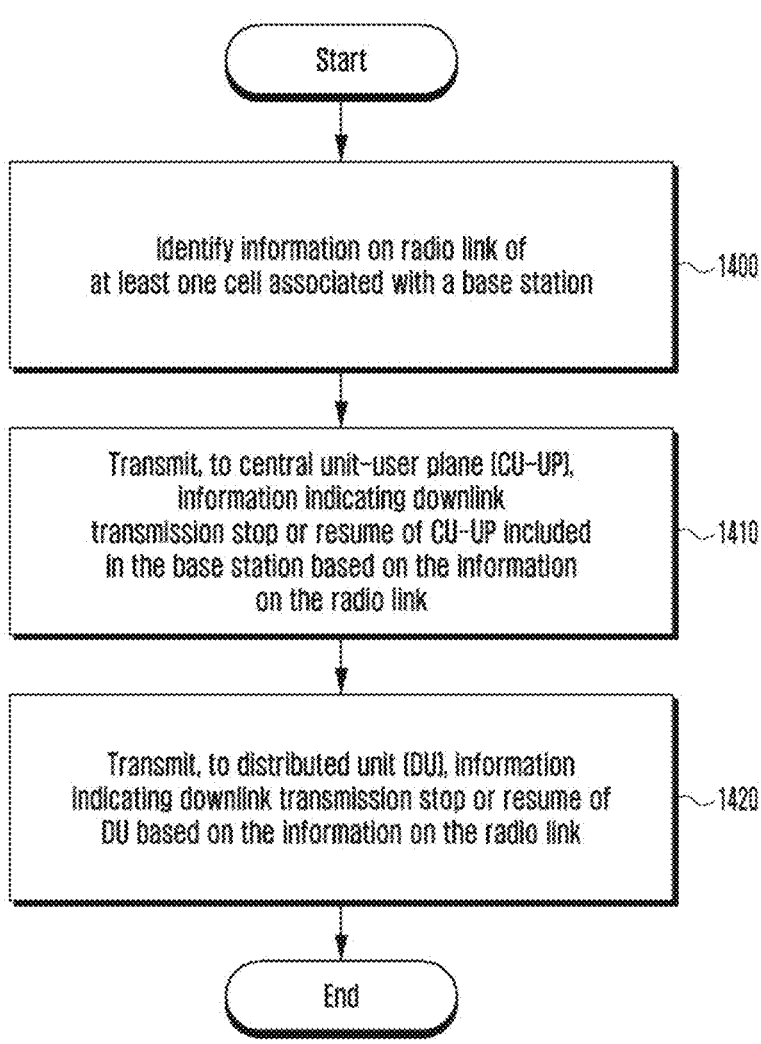
FIG. 14 is a flowchart illustrating an operation of a CU-CP in the case where a radio link failure (RLF) or a radio link (RL) recovery occurs in a SN in a wireless communication system supporting dual connectivity according to an embodiment of the disclosure.

FIG. 14 is a flowchart illustrating an operation of a CU-CP in the case where a radio link failure (RLF) or a radio link (RL) recovery occurs in a SN in a wireless communi-cation system supporting dual connectivity according to an embodiment of the disclosure.

Referring to FIG. 14, at operation 1400, a gNB-CU-CP may identify information related to a radio link of at least one cell related to a base station.

The information related to the radio link of the at least one cell related to the base station according to various embodi-ments of the disclosure may include information related to SCG-RLF.

For example, if a UE detects the RLF, the gNB-CU-CP may receive information related to the SCG-RLF (SCG failure information) from a master base station (MeNB) (UE-detected RLF)

Further, if a DU detects the RLF, the gNB-CU-CP may receive information related to the RLF (radio link fail information) from a gNB-DU (DU-detected RLF).

According to various embodiments of the disclosure, the information related to a radio link of at least one cell related to the base station may include information related to a radio link recovery of a specific cell among serving cells belonging to a SN.

For example, if the UE detects the radio link recovery, the gNB-CU-CP may receive a NR measurement report (MR) related to RL recovery from the master base station (MeNB) (UE-detected RL recovery).

Further, if the DU detects the radio link recovery, the gNB-CU-CP may receive information related to SCG-RL recovery (e.g., radio link recovery cause information) from the gNB-DU (DU-detected RL recovery).

At operation 1410, the gNB-CU-CP may transmit a message (MSG) including information indicating downlink transmission stop or resume of the gNB-CU-UP (NR DL stop/resume indicator) or an information element (IE) to the gNB-CU-UP.

For example, if information related to the SCG-RLF (SCG failure information) is received from the master base station (MeNB) (UE-detected RLF) or information related to the RLF (radio link fail information) is received from the gNB-DU (DU-detected RLF) at operation 1400, the gNB-CU-CP may determine the SCG RLF, and it may transmit a message (MSG) including the information indicating the downlink transmission stop of the gNB-CU-UP (NR DL stop indicator) or the information element (IE) to the gNB-CU-UP.

For example, if it is determined that PScell is in a normal state through reception of a NR measurement report (MR) from the UE (UE-detected RL recovery) or information related to the radio link recovery from the gNB-DU (UE-detected RL recovery) at operation 1400, the gNB-CU-CP may determine the radio link recovery, and it may transmit the MSG including the information indicating the downlink transmission resume (NR DL resume indicator) of the gNB-CU-UP or the IE to the gNB-CU-UP.

At operation 1420, the gNB-CU-CP may transmit a message (MSG) including information indicating downlink transmission stop or resume of the gNB-DU (transmission stop/restart indicator) or an information element (IE) to the gNB-DU.

For example, if information related to the SCG-RLF (SCG failure information) is received from the master base station (MeNB) (UE-detected RLF) or information related to the RLF (radio link fail information) is received from the gNB-DU (DU-detected RLF) at operation 1400, the gNB-CU-CP may determine the SCG RLF, and it may transmit a message (MSG) including the information indicating the downlink transmission stop of the gNB-DU (transmission stop indicator) or the information element (IE) to the gNB-DU.

For example, if it is determined that the PScell is in a normal state through reception of the NR measurement report (MR) from the UE (UE-detected RL recovery) or information related to the radio link recovery from the gNB-DU (UE-detected RL recovery) at operation 1400, the gNB-CU-CP may determine the radio link recovery, and it may transmit the MSG including the information indicating the downlink transmission resume (transmission restart indicator) of the gNB-DU or the IE to the gNB-DU.

Referring to FIG. 14, the operation 1410 in which the gNB-CU-CP transmits information indicating the stop/resume of the downlink transmission to the gNB-CU-UP (NR DL stop/resume indicator) to the gNB-CU-UP and the operation 1420 in which the gNB-CU-CP transmits the information indicating the stop/resume of the transmission to the gNB-DU (transmission stop/restart indicator) to the gNB-DU are not limited to their operation order as described above, and the operation 1420 may be performed prior to the operation 1410, or the operations 1410 and 1420 may be simultaneously performed in parallel.

If the information related to the SCG-RLF (SCG failure information) is received from the master base station (MeNB) (UE-detected RLF) or the information related to the RLF (radio link fail information) is received from the gNB-DU (DU-detected RLF), the gNB-CU-CP according to various embodiments of the disclosure may transmit the message (MSG) including the information indicating the downlink transmission stop (NR DL stop indicator) or the information element (IE) to the gNB-CU-UP, and the gNB-CU-CP may also transmit the MSG including the information indicating the download transmission stop (transmission stop indicator) or the IE to the gNB-DU.

If it is determined that the PScell is in a normal state through reception of a NR measurement report (MR) from the UE (UE-detected RL recovery) or information related to the radio link recovery from the gNB-DU (UE-detected RL recovery) after transmitting the NR DL stop indicator to the gNB-CU-UP and transmitting the transmission stop indicator to the gNB-DU, the gNB-CU-CP according to various embodiments of the disclosure may transmit the MSG including the information indicating the downlink transmission resume (NR DL resume indicator) or the IE to the gNB-CU-UP, and the gNB-CU-CP may transmit the MSG including the information indicating the downlink transmission resume (transmission restart (resume) indicator) or the IE to the gNB-DU.

Figure 15:
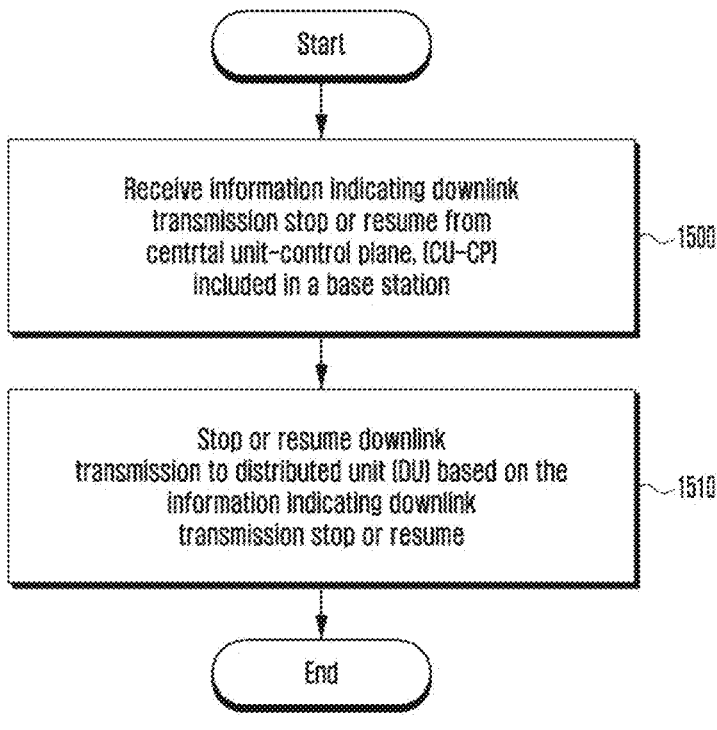
FIG. 15 is a flowchart illustrating an operation of a CU-UP in the case where a radio link failure (RLF) or a radio link (RL) recovery occurs in a SN in a wireless communication system supporting dual connectivity according to an embodiment of the disclosure.

FIG. 15 is a flowchart illustrating an operation of a CU-UP in the case where a radio link failure (RLF) or a radio link (RL) recovery occurs in a SN in a wireless communication system supporting dual connectivity according to an embodiment of the disclosure.

Referring to FIG. 15, at operation 1500, a gNB-CU-UP may receive a message (MSG) including information indicating downlink transmission stop or resume (NR DL stop/resume indicator) or an information element (IE) from a gNB-CU-CP.

According to various embodiments of the disclosure, if a UE or a DU determines a SCG RLF, the gNB-CU-UP may receive a message (MSG) including information indicating the downlink transmission stop (NR DL stop indicator) or the information element (IM) from the gNB-CU-CP.

According to various embodiments of the disclosure, if the UE or the DU determines a radio link recovery (e.g., if it is determined that PScell is in a normal state), the gNB-CU-UP may receive a MSG including information indicating the downlink transmission resume (NR DL resume indicator) or the IE from the gNB-CU-CP.

At operation 1510, the gNB-CU-UP may stop or resume the downlink transmission to the DU based on the information indicating the downlink transmission stop or resume (NR DL stop/resume indicator).

According to various embodiments of the disclosure, if the information indicating the downlink transmission stop (DL stop indicator) is received, the gNB-CU-UP according to various embodiments of the disclosure may stop the downlink transmission to the gNB-DU with respect to the corresponding SCG bearer.

For example, after receiving the information indicating the downlink transmission stop (NR DL stop indicator), if necessary, the gNB-CU-UP may suspend the NR path with respect to a SCG/split bearer in the corresponding UE. Further, if necessary, the gNB-CU-UP may perform a path switching and retransmission operation to LTE.

The gNB-CU-UP according to various embodiments of the disclosure may perform a resume operation with respect to the SCG/split bearer after receiving information indicating the downlink transmission resume (NR DL resume indicator). For example, if information indicating the downlink transmission resume (DL stop indicator) is received, the gNB-CU-UP may resume the transmission to the gNB-DU with respect to the corresponding SCG bearer.

FIG. 16 is a diagram illustrating a configuration of a message that a CU-CP included in SN transmits to a CU-UP or an information element in a wireless communication system supporting dual connectivity according to an embodiment of the disclosure.

Referring to FIG. 16, the information element (IE) 1600 indicated as information related to a cell group (cell group information) may include "DL TX stop" 1610 including information 1611 indicating downlink transmission stop of a CU-UP or information indicating a resume 1613.

As illustrated in FIG. 16, the information indicating the downlink transmission stop or resume of the CU-UP may be included in the information element of the "DL TX stop".

For example, the information indicating the downlink transmission stop or resume "DL TX stop" of the CU-UP may be transmitted through a BEARER CONTEXT MODIFICATION REQUEST.

Figure 17:
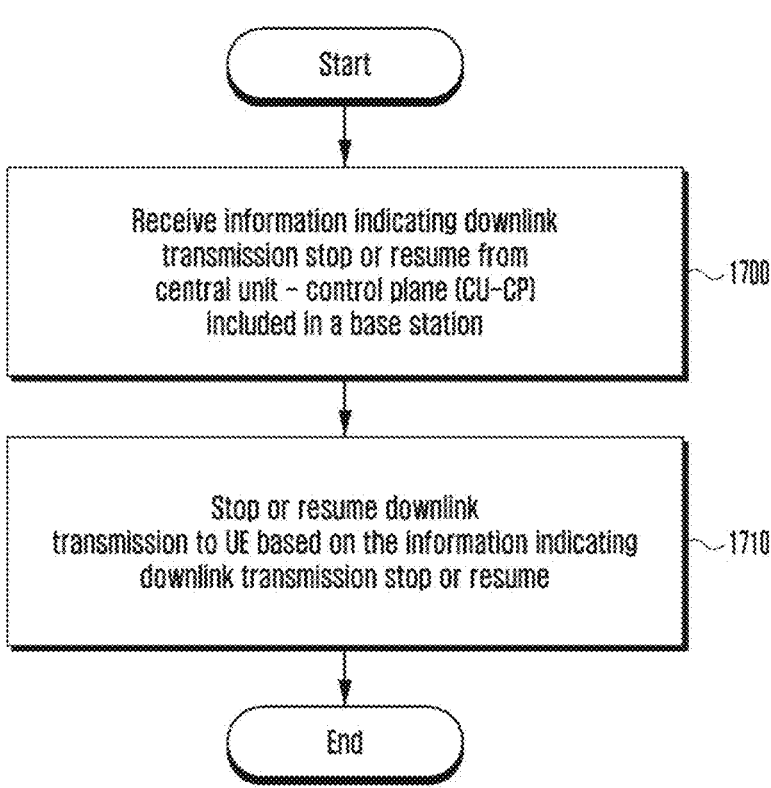
FIG. 17 is a flowchart illustrating an operation of a DU in the case where a radio link failure (RLF) or a radio link (RL) recovery occurs in a SN in a wireless communication system supporting dual connectivity according to an embodiment of the disclosure.

FIG. 17 is a flowchart illustrating an operation of a DU in the case where a radio link failure (RLF) or a radio link (RL) recovery occurs in a SN in a wireless communication system supporting dual connectivity according to an embodiment of the disclosure.

Referring to FIG. 17, at operation 1700, a gNB-DU may receive a message (MSG) including information indicating downlink transmission stop or resume (transmission stop/restart indicator) or an information element (IE) from a gNB-CU-CP.

According to various embodiments of the disclosure, if a UE or a DU determines SCG RLF, the gNB-DU may receive the message (MSG) including information indicating downlink transmission stop (transmission stop indicator) or the information element (IE) from the gNB-CU-CP.

According to various embodiments of the disclosure, if the UE or the DU determines a radio link recovery (e.g., if it is determined that PScell is in a normal state), the gNB-DU may receive the MSG including the information indicating the downlink transmission resume (transmission restart indicator) or the IE from the gNB-CU-CP.

At operation 1710, the gNB-DU may stop or resume the downlink transmission to the UE based on the information indicating the downlink transmission stop or resume (transmission stop/restart indicator).

If the information indicating the downlink transmission stop (transmission stop indicator) is received, the gNB-DU according to various embodiments of the disclosure may stop the downlink transmission to the UE with respect to the corresponding SCG bearer.

For example, the gNB-DU may perform a suspend operation with respect to a SCG/split bearer for the corresponding UE after receiving the information indicating the downlink transmission stop (transmission stop indicator).

The gNB-DU according to various embodiments of the disclosure may perform the resume operation with respect to the SCG/split bearer for the corresponding UE after receiving the information indicating the downlink transmission resume (transmission restart (resume) indicator). For example, if the information indicating the transmission resume (transmission restart indicator) is received, the gNB-DU may resume the transmission to the UE with respect to the corresponding SCG bearer.

FIG. 18 is a diagram illustrating a configuration of a message that a CU-CP included in SN transmits to a DU or an information element in a wireless communication system supporting dual connectivity according to an embodiment of the disclosure.

Referring to FIG. 18, the information element indicating downlink transmission or resume of the DU (transmission stop indicator 1810) may include information 1811 indicating the downlink transmission stop of the DU or information 1813 indicating the resume.

For example, the information indicating the downlink transmission or resume of the DU may be transmitted through a UE CONTEXT MODIFICATION REQUEST.

FIG. 19 is a diagram illustrating a configuration of a message that a DU included in SN transmits to a CU-CP or an information element when radio link (RL) recovery occurs in the SN of a wireless communication system supporting dual connectivity according to an embodiment of the disclosure.

Referring to FIG. 19, if the DU detects the radio link recovery, "radio network layer cause" 1910 including information related to the recovery (RL recovery 1911) may be transmitted to the CU-CP.

For example, if the DU detects the radio link recovery, the information related to the recovery may be transmitted through a UE CONTEXT MODIFICATION REQUIRED.

Figure 20:
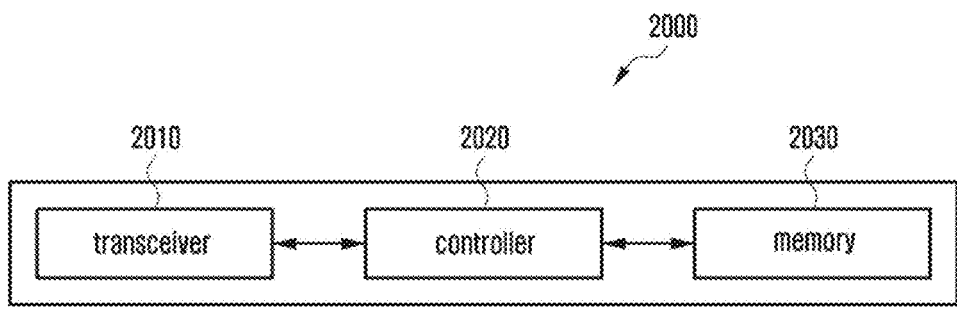
FIG. 20 is a block diagram of a control plane (CU-CP) included in a SN in a wireless communication system supporting dual connectivity according to an embodiment of the disclosure.

FIG. 20 is a block diagram of a control plane CU-CP 2000 included in a SN in a wireless communication system supporting dual connectivity according to an embodiment of the disclosure.

Referring to FIG. 20, the CU-CP 2000 according to various embodiments may include a transceiver 2010, a controller 2020, and a memory 2030.

Hereinafter, the above constituent elements will be described in due course.

The transceiver according to various embodiments may transmit and receive signals, information or data to and from a CU-UP and a DU, which are external network elements included in a master base station or a secondary base station according to various embodiments of the disclosure.

The controller according to various embodiments may include at least one processor.

The processor according to various embodiments may control an overall operation of the CU-CP. The processor may control an overall operation of the CU-CP according to the above-described various embodiments of the disclosure.

The at least one processor according to various embodiments may control the transceiver to receive, from the master base station, a secondary base station addition/modification/release request for requesting a secondary base station to allocate/modify/release a radio resource for a bearer.

The transceiver according to various embodiments of the disclosure may receive information related to a radio link of at least one cell related to the secondary base station.

For example, the information related to the radio link may include information related to radio link failure or information related to radio link discovery.

Further, the information related to the radio link may be received from a distributed unit (DU) in the master base station or the secondary base station.

The processor according to various embodiments of the disclosure may identify the information related to the radio link of the at least one cell related to the base station.

The processor according to various embodiments of the disclosure may control the transceiver to transmit, to the CU-CP, information indicating downlink transmission stop or resume of a central unit-user plane (CU-UP) included in the base station based on the information related to the radio link.

For example, the information indicating the downlink transmission stop or resume of the CU-UP may be transmitted through a BEARER CONTEXT MODIFICATION REQUEST.

The processor according to various embodiments of the disclosure may control the transceiver to transmit, to the distributed unit (DU), information indicating downlink transmission stop or resume of the DU based on the information related to the radio link.

For example, the information indicating the downlink transmission stop or resume of the DU may be transmitted through a UE CONTEXT MODIFICATION REQUEST.

If the information related to the radio link is information related to the radio link failure, the processor according to various embodiments of the disclosure may control the transceiver to transmit the information indicating the downlink transmission stop of the CU-UP to the CU-UP, and to transmit the information indicating the downlink transmission stop of the DU to the DU.

If the information related to the radio link is information related to the radio link recovery, the processor according to various embodiments of the disclosure may control the transceiver to transmit the information indicating the downlink transmission resume of the CU-UP to the CU-UP, and to transmit the information indicating the downlink transmission resume of the DU to the DU.

Figure 21:
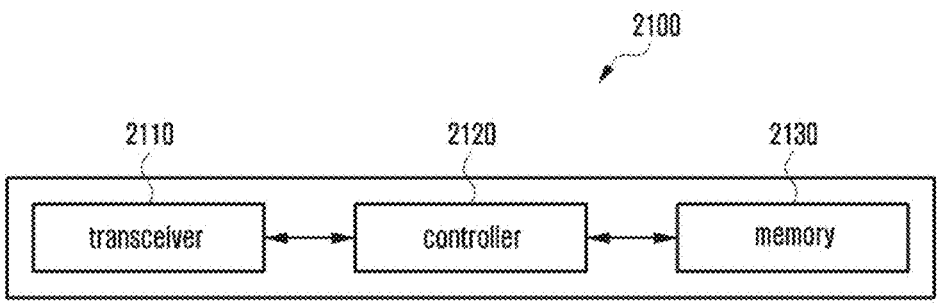
FIG. 21 is a block diagram of a user plane (CU-UP) included in a SN in a wireless communication system supporting dual connectivity according to an embodiment of the disclosure.

FIG. 21 is a block diagram of a user plane CU-UP 2100 included in a SN in a wireless communication system supporting dual connectivity according to an embodiment of the disclosure.

Referring to FIG. 21, the CU-UP 2100 according to various embodiments may include a transceiver 2110, a controller 2120, and a memory 2130.

Hereinafter, the above constituent elements will be described in due course.

The transceiver according to various embodiments may transmit and receive signals, information or data to and from a CU-CP and a DU, which are external network elements included in a master base station or a secondary base station according to various embodiments of the disclosure.

The controller according to various embodiments may include at least one processor.

The processor according to various embodiments may control an overall operation of the CU-UP. The processor may control an overall operation of the CU-UP according to the above-described various embodiments of the disclosure.

The processor according to various embodiments of the disclosure may control the transceiver to receive information indicating downlink transmission stop or resume from a central unit-control plane (CU-CP) included in the base station.

For example, the information indicating the downlink transmission stop or resume may be received through a BEARER CONTEXT MODIFICATION REQUEST.

The processor according to various embodiments of the disclosure may control to stop or resume downlink transmission to a distributed unit (DU) based on the information indicating the downlink transmission stop or resume.

For example, if the information indicating the downlink transmission stop is received, the processor may control to stop the downlink transmission to the distributed unit (DU) and to perform a path switching and retransmission operation to another base station.

For example, if the information indicating the downlink transmission resume is received, the processor may control to resume the downlink transmission to the distributed unit (DU).

Figure 22:
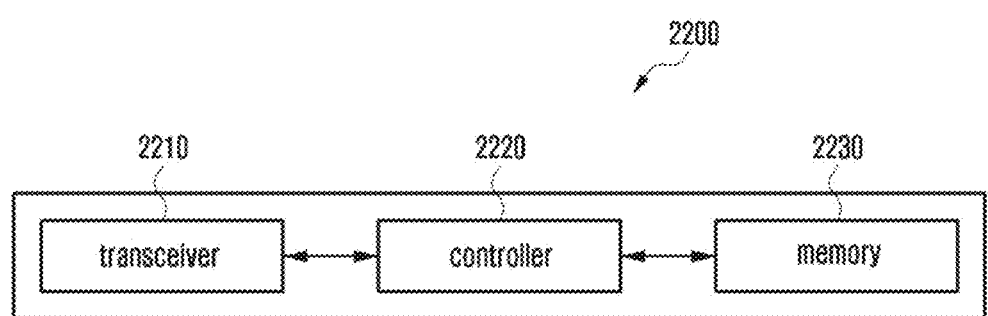
FIG. 22 is a block diagram of a distributed unit (DU) included in a SN in a wireless communication system supporting dual connectivity according to an embodiment of the disclosure.

FIG. 22 is a block diagram of a distributed unit (DU) included in a SN in a wireless communication system supporting dual connectivity according to an embodiment of the disclosure.

Referring to FIG. 22, a DU 2200 according to various embodiments may include a transceiver 2210, a controller 2220, and a memory 2230.

Hereinafter, the above constituent elements will be described in due course.

The transceiver according to various embodiments may transmit and receive signals, information or data to and from a CU-CP and a CU-UP, which are external network elements included in a master base station or a secondary base station according to various embodiments of the disclosure.

The controller according to various embodiments may include at least one processor.

The processor according to various embodiments may control an overall operation of the DU. The processor may control the overall operation of the DU according to the above-described various embodiments of the disclosure.

The processor according to various embodiments of the disclosure may detect radio link failure or radio link recovery with respect to at least one cell related to the base station.

For example, if the radio link failure is detected, the processor may control the transceiver to transmit information related to the RLF to a SgNB-CU-CP.

For example, the information related to the RLF may include failure cause (e.g., radio link fail, Out of sync) information.

For example, if the radio link recovery is detected, the processor may control the transceiver to transmit information related to the radio link recovery (RL recovery information) to a gNB-CU-CP.

The processor according to various embodiments of the disclosure may receive the information indicating the downlink transmission stop or resume through a UE CONTEXT MODIFICATION REQUEST received from the CU-CP.

The processor according to various embodiments of the disclosure may control to stop or resume the downlink transmission to a UE based on the information indicating the downlink transmission stop or resume.

Figure 23:
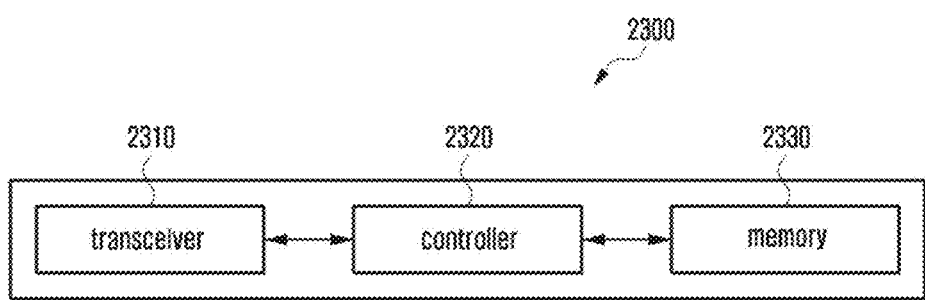
FIG. 23 is a block diagram of a user equipment (UE) in a wireless communication system supporting dual connectivity according to an embodiment of the disclosure.

FIG. 23 is a block diagram of a UE 2300 in a wireless communication system supporting dual connectivity according to an embodiment of the disclosure.

Referring to FIG. 23, the UE 2300 according to various embodiments may include a transceiver 2310, a controller 2320, and a memory 2330.

Hereinafter, the above constituent elements will be described in due course.

The transceiver according to various embodiments may transmit and receive signals, information or data to and from a master base station or a secondary base station according to various embodiments of the disclosure.

The controller according to various embodiments may include at least one processor.

The processor according to various embodiments may control an overall operation of the UE. The processor may control the overall operation of the UE according to the above-described various embodiments of the disclosure.

The UE according to various embodiments is a UE supporting dual connectivity, and it may use a radio resource having a high data rate of the secondary base station through procedures for addition/release/modification of the secondary base station in accordance with the condition in a state where it is basically connected to the master base station.

The at least one processor according to various embodiments may control the transceiver to simultaneously transmit and receive packets to and from the master base station and the secondary base station.

The processor according to various embodiments of the disclosure may detect radio link failure or radio link recovery with respect to at least one cell related to the base station.

For example, if SCG-RLF is determined, the processor may stop SCG transmission to a gNB-DU.

For example, if the SCG-RLF is determined, the processor may control the transceiver to transmit the information related to the RLF (SCG failure information) to the master base station (MeNB).

For example, the SCG failure information may include failure cause (e.g., out of sync) information. In this case, the master base station (eNB) may transmit the SCG failure information received from the UE to the secondary base station (gNB).

For example, if the radio link recovery is detected, the processor may perform a measurement operation with respect to at least one cell (NR cell) related to the secondary base station.

Further, if a report event is triggered during the measurement, the processor may control the transceiver to transmit a measurement report (MR) to the master base station (eNB). For example, if an event in which a radio link of PSCell of the secondary base station is recovered occurs, the MR may be triggered.

For example, the master base station (eNB) may transmit the measurement report (NR MR) received from the UE to the secondary base station (gNB).

Even if the RLF or RL recovery occurs in a secondary node during the dual connectivity operation between heterogeneous or homogeneous RATs in the UE, it is possible to perform efficient failure/recovery management through the stop/resume operations with respect to the existing cell and bearer under leading of the base station, and through this, an improved data interruption time as compared with the existing one can be expected.

In the above-described detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form. The embodiments described in this specification have been individually described, but two or more of the embodiments may be combined and practiced.

Although the detailed embodiments have been described in the detailed description of the disclosure, the disclosure may be modified in various ways without departing from the scope of the disclosure. Accordingly, the scope of the disclosure should not be limited to the above-described embodiments, but should be defined by not only the claims, but equivalents thereof.

The embodiments of the disclosure and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A or/and B", "A, B or C" or "at least one of A, B and/or C", may include all of possible combinations of listed items together. Expressions, such as "a first," "a second," "the first" and "the second", may modify corresponding elements regardless of the sequence and/or importance, and are used to only distinguish one element from the other element and do not limit corresponding elements. When it is described that one (e.g., first) element is "(operatively or communicatively) connected to" or "coupled with" the other (e.g., second) element, one element may be directly connected to the other element or may be connected to the other element through another element (e.g., third element).

The "module" used in the disclosure includes a unit configured with hardware, software or firmware, and may be interchangeably used with a term, such as logic, a logical block, a part or a circuit. The module may be an integrated part, a minimum unit to perform one or more functions, or a part thereof. For example, the module may be configured with an application-specific integrated circuit (ASIC).

The various embodiments of the disclosure may be implemented as machine (e.g., computer)-readable storage media (e.g., software (e.g., program) including instructions stored in an internal memory or external memory). A device is an apparatus capable of fetching instructions stored in the storage media and operating according to the fetched instructions, and may include a base station or UE according to various embodiments. If the instruction is executed by the processor (e.g., the controller 2020 of FIG. 20 or the controller 2120 of FIG. 21 or the controller 2220 of FIG. 22 or the controller 2320 of FIG. 23), a function corresponding to the instruction may be directly performed by the processor or may be performed using other elements under the control of the processor. The instruction may include code generated or executed by a compiler or interpreter.

The machine-readable storage media may be provided in the form of a non-transitory storage medium. In this case, the term "non-transitory" means that the storage media do not include a signal and is tangible, and is not limited to whether data is stored in the storage media semi-permanently or temporally.

The method according to various embodiments disclosed in the disclosure may be included in a computer program product and provided. The computer program product may be traded as a product between a seller and a purchaser. The computer program product may be online distributed in the form of device-readable storage media (e.g., compact disc read only memory (CD-ROM)) or through an app store (e.g., PlayStore™). In the case of the online distribution, at least some of the computer program product may be at least temporarily stored or temporally generated in storage media, such as the memory of the server of a manufacturer, the server of an app store or a relay server.

Each of elements (e.g., module or program) according to various embodiments may be configured with a single entity or a plurality of entities. Some of the above-described sub-elements may be omitted other sub-elements may be further included in various embodiments. Alternatively or additionally, some elements (e.g., modules or programs) may be integrated into one entity, and may perform a function, performed by each corresponding element prior to the integration, identically or similarly.

Operations performed by a module, a program or other elements according to various embodiments may be executed sequentially, in parallel, repeatedly, or heuristically, or at least some operations may be executed in different order or may be omitted, or other operations may be added.

The methods of the embodiments illustrated in FIGS. 1 to 23 can include a combination of methods from more than one illustration.

For example, FIGS. 1 to 23 illustrate operations related to a secondary node operation when a radio link failure or recovery occurs in the secondary node based on various embodiments, the methods can include a combination of methods from more than one illustration.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a network node configured to perform functions of central unit-control plane (CU-CP) of a next generation node B (gNB), the method comprising:
    transmitting, through E1l interface, to a central unit-user plane (CU-UP), a bearer context modification request message including cell group information, the cell group information including:
        a cell group identifier (ID) for indicating a cell group being one of a master cell group (MCG) and a secondary cell group (SCG), and
        downlink transmission information being a value indicating a resume of downlink transmission for the cell group, among the value and another value indicating a stop of the downlink transmission, wherein the downlink transmission information is used to resume the downlink transmission stopped before transmitting the bearer context modification request message; and
    receiving, through the E1 interface, from the CU-UP, a bearer context modification response message.

2. The method of claim 1, wherein the cell group information further includes:
    uplink (UL) configuration information for indicating whether the cell group is used for UL traffic, and
    radio access technology (RAT) type information for indicating one of RATs including evolved-universal mobile telecommunications system (UMTS) terrestrial radio access (E-UTRA) and new radio (NR).

3. The method of claim 1, further comprising:
    transmitting, through F1 interface, to a distributed unit (DU), a user equipment (UE) context modification request message including a transmission indicator, wherein the transmission indicator indicates a stop or a resume of downlink transmission for a UE in the DU.

4. The method of claim 1, further comprising:
    receiving, from an evolved node B (eNB), a modification request message to modify bearer context related to the gNB,
    wherein the eNB and the gNB are associated with a dual connectivity,
    wherein the eNB corresponds to a master node (MN), and
    wherein the gNB corresponds to a secondary node (SN).

5. The method of claim 1,
    wherein the CU-CP has a radio resource control (RRC) and a control part of a packet data convergence protocol (PDCP) protocol, and
    wherein the CU-UP has a user plane part of the PDCP protocol.

6. A method performed by a network node configured to perform functions of central unit-user plane (CU-UP) of a next generation node B (gNB), the method comprising:
    receiving, through E1 interface, from a central unit-control plane (CU-CP), a bearer context modification request message including cell group information, the cell group information including:
        a cell group identifier (ID) for indicating a cell group being one of a master cell group (MCG) and a secondary cell group (SCG), and
        downlink transmission information being a value indicating a resume of downlink transmission for the cell group, among the value and another value indicating a stop of the downlink transmission, wherein the downlink transmission information is used to resume the downlink transmission stopped before receiving the bearer context modification request message; and
    transmitting, through the E1 interface, to the CU-CP, a bearer context modification response message.

7. The method of claim 6, wherein the cell group information further includes:
    uplink (UL) configuration information for indicating whether the cell group is used for UL traffic, and
    radio access technology (RAT) type information for indicating one of RATs including evolved-universal mobile telecommunications system (UMTS) terrestrial radio access (E-UTRA) and new radio (NR).

8. The method of claim 6,
    wherein the gNB and an evolved node B (eNB) are associated with a dual connectivity,
    wherein the eNB corresponds to a master node (MN), and
    wherein the gNB corresponds to a secondary node (SN).

9. The method of claim 6,
    wherein the CU-CP has a radio resource control (RRC) and a control part of a packet data convergence protocol (PDCP) protocol, and
    wherein the CU-UP has a user plane part of the PDCP protocol.

10. The method of claim 9, further comprising:
    receiving, through E1 interface, from the CU-CP, a previous bearer context modification request message including previous cell group information before receiving the bearer context modification request message,
    wherein the previous cell group information includes the cell group ID and another downlink transmission information indicating the stop of the downlink transmission.

11. A network node configured to perform functions of central unit-control plane (CU-CP) of a next generation node B (gNB), comprising:

at least one processor; and memory storing instructions that, when executed by the at least one processor, cause the CU-CP to:

transmit, through E1 interface, to a central unit-user plane (CU-UP), a bearer context modification request message including cell group information, the cell group information including:

a cell group identifier (ID) for indicating a cell group being one of a master cell group (MCG) and a secondary cell group (SCG), and downlink transmission information being a value indicating a resume of downlink transmission for the cell group, among the value and another value indicating a stop of the downlink transmission, wherein the downlink transmission information is used to resume the downlink transmission stopped before transmitting the bearer context modification request message, and receive, through the E1 interface, from the CU-UP, a bearer context modification response message.

12. The network node of claim 11, wherein the cell group information further includes:

uplink (UL) configuration information for indicating whether the cell group is used for UL traffic, and radio access technology (RAT) type information for indicating one of RATs including evolved-universal mobile telecommunications system (UMTS) terrestrial radio access (E-UTRA) and new radio (NR).

13. The network node of claim 11, wherein the instructions, when executed by the processor, cause the CU-CP to:

transmit, through F1 interface, to a distributed unit (DU), a user equipment (UE) context modification request message including a transmission indicator, and wherein the transmission indicator indicates a stop or a resume of downlink transmission for a UE in the DU.

14. The network node of claim 11, wherein the instructions, when executed by the processor, cause the CU-CP to: receive, from an evolved node B (eNB), a modification request message to modify bearer context related to the gNB, wherein the eNB and the gNB are associated with a dual connectivity, wherein the eNB corresponds to a master node (MN), and wherein the gNB corresponds to a secondary node (SN).

15. The network node of claim 11, wherein the CU-CP has a radio resource control (RRC) and a control part of a packet data convergence protocol (PDCP) protocol, and wherein the CU-UP has a user plane part of the PDCP protocol.

16. A network node configured to perform functions of central unit-user plane (CU-UP) of a next generation node B (gNB), comprising:

memory storing instructions, a transceiver; and a processor, wherein the instructions, when executed by the processor, cause the CU-UP to:

receive, through E1 interface, from a central unit-control plane (CU-CP), a bearer context modification request message including cell group information, the cell group information including:

a cell group identifier (ID) for indicating a cell group being one of a master cell group (MCG) and a secondary cell group (SCG), and downlink transmission information being a value indicating a resume of downlink transmission for the cell group, among the value and another value indicating a stop of the downlink transmission, wherein the downlink transmission information is used to resume the downlink transmission stopped before receiving the bearer context modification request message, and transmit, through the E1 interface, to the CU-CP, a bearer context modification response message.

17. The network node of claim 16, wherein the cell group information further includes:

uplink (UL) configuration information for indicating whether the cell group is used for UL traffic, and radio access technology (RAT) type information for indicating one of RATs including evolved-universal mobile telecommunications system (UMTS) terrestrial radio access (E-UTRA) and new radio (NR).

18. The network node of claim 16, wherein the eNB and the gNB are associated with a dual connectivity, wherein the eNB corresponds to a master node (MN), and wherein the gNB corresponds to a secondary node (SN).

19. The network node of claim 16, wherein the CU-CP has a radio resource control (RRC) and a control part of a packet data convergence protocol (PDCP) protocol, and wherein the CU-UP has a user plane part of the PDCP protocol.

20. The network node of claim 16, wherein the instructions, when executed by the processor, cause the CU-UP to: receive, through E1 interface, from the CU-CP, a previous bearer context modification request message including previous cell group information before receiving the bearer context modification request message, and wherein the previous cell group information includes the cell group ID and another downlink transmission information indicating the stop of the downlink transmission.

* * * * *